United States Patent
Singh et al.

(10) Patent No.: US 8,958,412 B2
(45) Date of Patent: Feb. 17, 2015

(54) METHODS AND APPARATUS FOR UPLINK TIMING ALIGNMENT IN SYSTEM WITH LARGE NUMBER OF ANTENNAS

(71) Applicant: Samsung Electronics Co., Ltd, Suwon-si, Gyeonggi-do (KR)

(72) Inventors: Jaspreet Singh, Richardson, TX (US); Zhouyue Pi, Allen, TX (US); Ying Li, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 13/872,844

(22) Filed: Apr. 29, 2013

(65) Prior Publication Data

US 2013/0301619 A1    Nov. 14, 2013

Related U.S. Application Data

(60) Provisional application No. 61/646,077, filed on May 11, 2012, provisional application No. 61/651,397, filed on May 24, 2012.

(51) Int. Cl.
*H04W 56/00*    (2009.01)

(52) U.S. Cl.
CPC ............ *H04W 56/004* (2013.01); *H04W 56/00* (2013.01)
USPC ............ 370/350; 370/254; 370/336; 370/328

(58) Field of Classification Search
CPC ............ H04W 56/004; H04W 56/0055; H04J 3/0682
USPC ......... 370/254, 255, 328, 329, 330, 336, 345, 370/349, 350

See application file for complete search history.

(56) References Cited

U.S. PATENT DOCUMENTS

| | | | |
|---|---|---|---|
| 8,630,588 B2 * | 1/2014 | Liu et al. ................. | 455/63.1 |
| 8,706,039 B2 * | 4/2014 | Zhang et al. ............... | 455/63.1 |
| 2006/0040706 A1 | 2/2006 | Wu et al. | |
| 2008/0085715 A1 | 4/2008 | Alm et al. | |
| 2011/0158116 A1 * | 6/2011 | Tenny et al. ............... | 370/252 |
| 2011/0249550 A1 | 10/2011 | Luz et al. | |
| 2011/0310861 A1 | 12/2011 | Jia et al. | |
| 2013/0083682 A1 * | 4/2013 | Ng et al. ................. | 370/252 |
| 2013/0235851 A1 * | 9/2013 | Abu-Surra et al. ........... | 370/336 |
| 2013/0242875 A1 * | 9/2013 | Abraham et al. ............ | 370/328 |
| 2013/0242951 A1 * | 9/2013 | Lee et al. ................. | 370/336 |

OTHER PUBLICATIONS

International Search Report dated Aug. 27, 2013 in connection with International Patent Application No. PCT/KR2013/004091, 3 pages.
Written Opinion of International Searching Authority dated Aug. 27, 2013 in connection with International Patent Application No. PCT/KR2013/004091, 6 pages.
3GPP TSG RAN WG1 Meeting #68bis; "Uplink Timing Advance for CoMP"; Huawei, HiSilicon; Mar. 26-30, 2012; Jeju, Korea; 4 pages.

\* cited by examiner

*Primary Examiner* — Ahmed Elallam

(57) ABSTRACT

A mobile station is configured to perform a method for uplink timing alignment in a wireless network. The method includes receiving a first downlink synchronization signal from a base station on a first beam pair at a first time associated with a first propagation delay. The method also includes receiving a second downlink synchronization signal from the base station on a second beam pair at a second time associated with a second propagation delay. The method further includes determining a second timing advance for the second beam pair based on a known first timing advance for the first beam pair and a time difference between the first time and the second time.

24 Claims, 14 Drawing Sheets

METHODS AND APPARATUS FOR UPLINK TIMING ALIGNMENT IN SYSTEM WITH LARGE NUMBER OF ANTENNAS

CROSS-REFERENCE TO RELATED APPLICATION(S) AND CLAIM OF PRIORITY

The present application is related to U.S. Provisional Patent Application No. 61/646,077, filed May 11, 2012, entitled "METHODS AND APPARATUS FOR UPLINK TIMING ALIGNMENT IN MILLIMETER WAVE MOBILE COMMUNICATION SYSTEM". The present application is also related to U.S. Provisional Patent Application No. 61/651,397, filed May 24, 2012, entitled "METHODS AND APPARATUS FOR UPDATE OF TIMING ADVANCE PARAMETERS IN A COMMUNICATION SYSTEM". Provisional Patent Application Nos. 61/646,077 and 61/651,397 are assigned to the assignee of the present application and are hereby incorporated by reference into the present application as if fully set forth herein. The present application hereby claims priority under 35 U.S.C. §119(e) to U.S. Provisional Patent Application Nos. 61/646,077 and 61/651,397.

TECHNICAL FIELD

The present application relates generally to wireless communication and, more specifically, to a method for uplink timing alignment in a system with a large number of antennas.

BACKGROUND

The field of mobile communication has witnessed a great revolution over the past two decades, with rapid development of new technologies to satisfy the ever increasing appetite for mobile communication applications and services. Examples of such technologies include CDMA 2000 1xEV-DO systems developed by 3GPP2, WCDMA, HSPA, and LTE systems developed by 3GPP, and mobile WiMAX systems developed by IEEE. Although the current wireless technologies, such as LTE/LTE-A, can provide data rates in the range of tens to hundreds of mega bits per second, their capacity may soon be exhausted by increasing demands for even higher data rates required by data-intensive applications such as video and music streaming. Furthermore, the number of subscribers to mobile communication services (already exceeding 5 billion), is expected to continue to grow rapidly.

SUMMARY

A method for uplink timing alignment by a mobile station in a wireless network is provided. The method includes receiving a first downlink synchronization signal from a base station on a first beam pair at a first time associated with a first propagation delay. The method also includes receiving a second downlink synchronization signal from the base station on a second beam pair at a second time associated with a second propagation delay. The method further includes determining a second timing advance for the second beam pair based on a known first timing advance for the first beam pair and a time difference between the first time and the second time.

An apparatus for use in a mobile station configured for uplink timing alignment in a wireless network is provided. The apparatus includes a processor configured to receive a first downlink synchronization signal from a base station on a first beam pair at a first time associated with a first propagation delay, receive a second downlink synchronization signal from the base station on a second beam pair at a second time associated with a second propagation delay, and determine a second timing advance for the second beam pair based on a known first timing advance for the first beam pair and a time difference between the first time and the second time.

A method for uplink timing alignment by a base station in a wireless network is provided. The method includes transmitting a first downlink synchronization signal to a mobile station on a first beam pair, the first downlink synchronization signal received at the mobile station at a first time associated with a first propagation delay. The method also includes transmitting a second downlink synchronization signal to the mobile station on a second beam pair, the second downlink synchronization signal received at the mobile station at a second time associated with a second propagation delay. The method further includes receiving from the mobile station a time difference between the first time and the second time, and determining a second timing advance for the second beam pair based on a known first timing advance for the first beam pair and the time difference between the first time and the second time.

An apparatus for use in a base station configured for uplink timing alignment in a wireless network is provided. The apparatus includes a processor configured to transmit a first downlink synchronization signal to a mobile station on a first beam pair, the first downlink synchronization signal received at the mobile station at a first time associated with a first propagation delay, transmit a second downlink synchronization signal to the mobile station on a second beam pair, the second downlink synchronization signal received at the mobile station at a second time associated with a second propagation delay, and receive from the mobile station a time difference between the first time and the second time, and determining a second timing advance for the second beam pair based on a known first timing advance for the first beam pair and the time difference between the first time and the second time.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
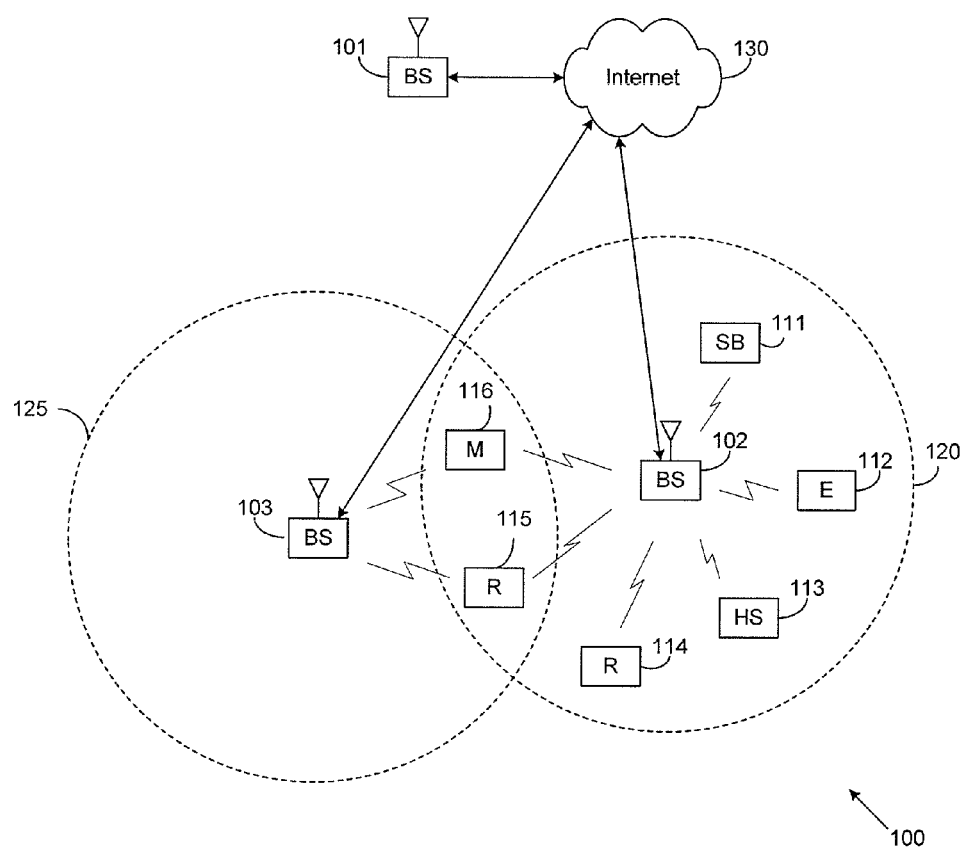
FIG. 1 illustrates a wireless communication network, according to embodiments of this disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

In this disclosure, a limited number and types of base stations and mobile stations, service flows, connections, routes, or use cases may be used as examples for illustration. However, the embodiments disclosed herein are also applicable to other numbers and types of base stations, mobile stations, service flows, connections, routes, and other related use cases.

The following documents and standards descriptions are hereby incorporated into the present disclosure as if fully set forth herein: (i) Z. Pi and F. Khan, "An Introduction To Millimeter-Wave Mobile Broadband Systems", IEEE Communication Magazine, June 2011 (hereinafter "REF1"); (ii) "Millimeter wave propagation: Spectrum management implications", Federal Communications Commission, Office of Engineering and Technology, Bulletin Number 70, July, 1997 (hereinafter "REF2"); (iii) F. Khan, "LTE for 4G Mobile Broadband", Cambridge Univ. Press, 2009; (hereinafter "REF3"); (iv) S. A. Surra, et al., "Methods and apparatus to transmit and receive synchronization signals in a mobile communication system", 2012 (hereinafter "REF4"); and (v) 3GPP, Technical Specification Group Radio Access Network; Evolved Universal Terrestrial Radio Access (E-UTRA) (hereinafter "REF5").

In REF1, it is proposed to utilize the millimeter (mm) spectrum for developing the next generation of broadband mobile communication systems. Conventionally, millimeter waves refer to radio waves with a wavelength in the range of approximately 1 mm-10 mm, which corresponds to a radio frequency of approximately 30 GHz-300 GHz. Vast amounts of spectrum (both licensed and unlicensed) are available in this mmwave band. For instance, in the United States, there is 7 GHz of unlicensed spectrum available around the 60 GHz frequency (referred to as the 60 GHz band). Further, in October 2003, the Federal Communications Commission (FCC) allocated 12.9 GHz of spectrum for high-density fixed wireless services in the United States (71-76 GHz, 81-86 GHz, and 92-95 GHz excluding the 94.0-94.1 GHz for Federal Government use). This spectrum allocation, collectively referred to as the E-band, is the largest spectrum allocation ever by the FCC—fifty times larger than the entire cellular spectrum.

Radio waves in the mmwave band exhibit several unique propagation characteristics. For example, compared with lower frequency radio waves, mmwaves are associated with higher propagation loss, have poorer ability to penetrate objects (such as buildings, walls, foliage, and the like), and are more susceptible to atmosphere absorption, deflection and diffraction due to particles (e.g., rain drops) in the air. Given these propagation characteristics, high-gain (directional) antennas may be employed in order to communicate over the mmwave band. Fortunately, due to the smaller wavelength of the mm waves, more antennas can be packed in a relatively small area, making it feasible to design high-gain antennas in small form factors.

Applications of the mmwave spectrum for military and radar communication already exist. However, the commercial viability of the mmwave spectrum for mobile communication has been limited because mmwave RFIC development is based on expensive packaging techniques and involves the use of compound semiconductor processes. Recently, there have been advances in development of mmwave transceivers in inexpensive silicon processes using low-cost packaging techniques. This has spurred several recent engineering and business efforts for commercial exploitation of the mmwave spectrum, particularly in the context of short-range wireless communication.

In particular, a few companies and industrial consortiums have developed technologies and standards to transmit data in the Gigabits/sec (Gbps) range using the unlicensed 60 GHz band within a few meters (up to 10 meters). Several industrial standards have also been developed targeting similar performance (e.g., WirelessHD technology, ECMA-387, and IEEE 802.15.3c), with other organizations also actively developing competing short-range 60 GHz Gbps connectivity technology, such as the Wireless Gigabit Alliance (WGA) and the IEEE 802.11 task group ad (TGad). Integrated circuit (IC) based transceivers are also available for some of these technologies.

The technological advances in the development of low-cost low-power mmwave RFIC and antenna solutions open up new avenues for mmwave communication system. In REF1, a next generation (5G) mobile broadband communication system exploiting the vast mmwave spectrum is described, and promises data rates that are magnitudes of order higher than currently achievable. An essential component of this system is the directional nature of communication between the base station (BS) and the mobile station (MS), in order to overcome the severe propagation losses encountered at mmwave frequencies. The directional nature of communication, wherein the BS and the MS communicate using beams, as opposed to omni-directional communication used in current mobile systems, poses new challenges, and calls for innovations, in several aspects of communication system design. Embodiments of this disclosure address the issue of timing advance for uplink (MS to BS) transmission in communication systems employing directional communication.

While the preceding discussion focused on mmwave communication with large number of antennas used at the BS and/or the MS, the methods disclosed here apply more generally to any communication system where the communication is directional (i.e., using beams). For instance, even at lower carrier frequencies (e.g., 2.4 GHz), the BS may still use a large number of antenna elements to synthesize narrow beams while transmitting to the MS, and the methods disclosed here apply to such systems as well. In general, systems with large number of antennas have been recently referred to in the art as "Massive MIMO" (multiple input multiple output) systems. This invention pertains to, but is not limited to, mmwave communication, Massive MIMO systems, and the like.

Figure 2A:
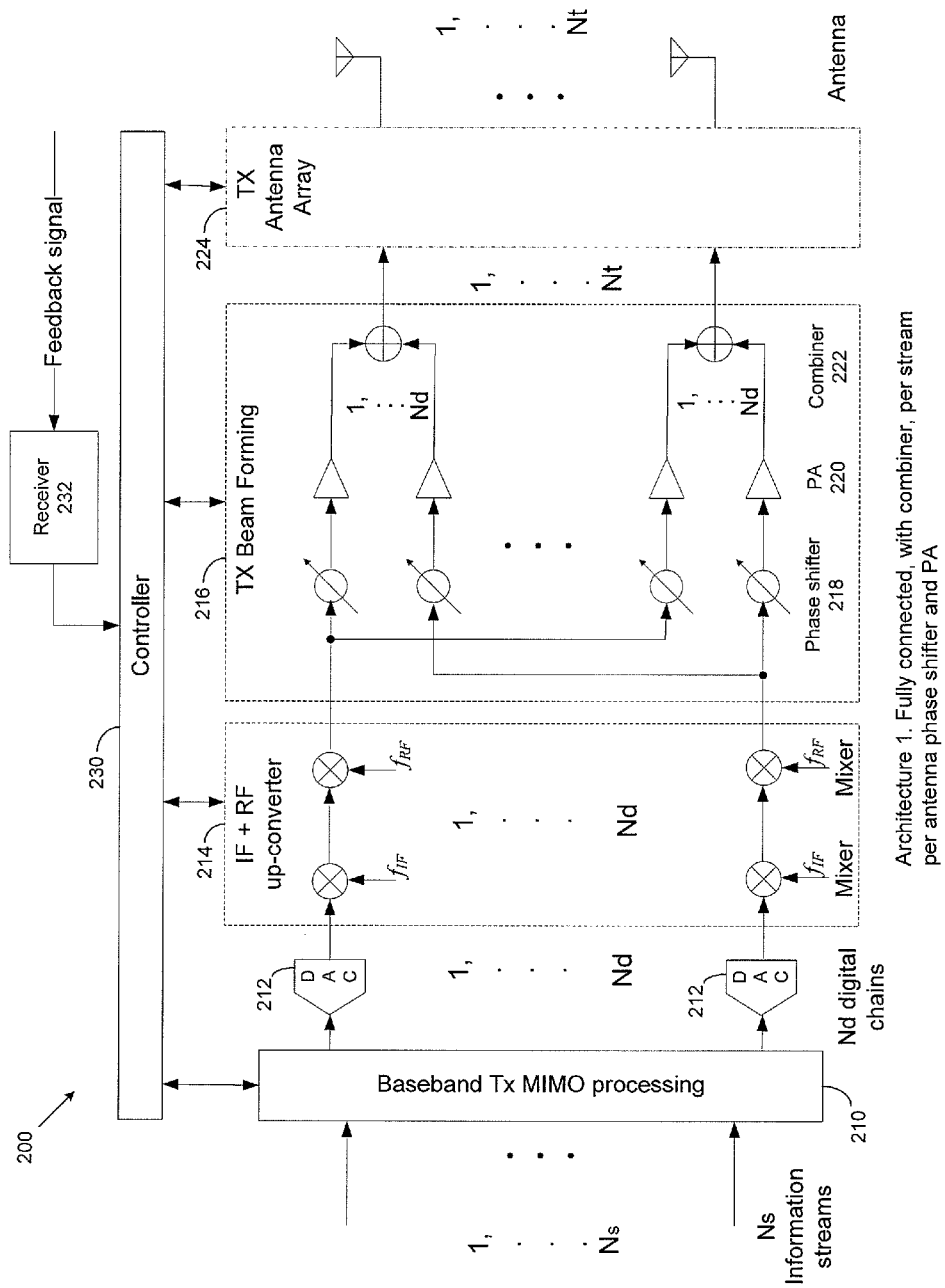
FIGS. 2A and 2B illustrate transmit paths for multiple input multiple output (MIMO) baseband processing and analog beam forming with a large number of antennas, according to embodiments of this disclosure.
Figure 2B:
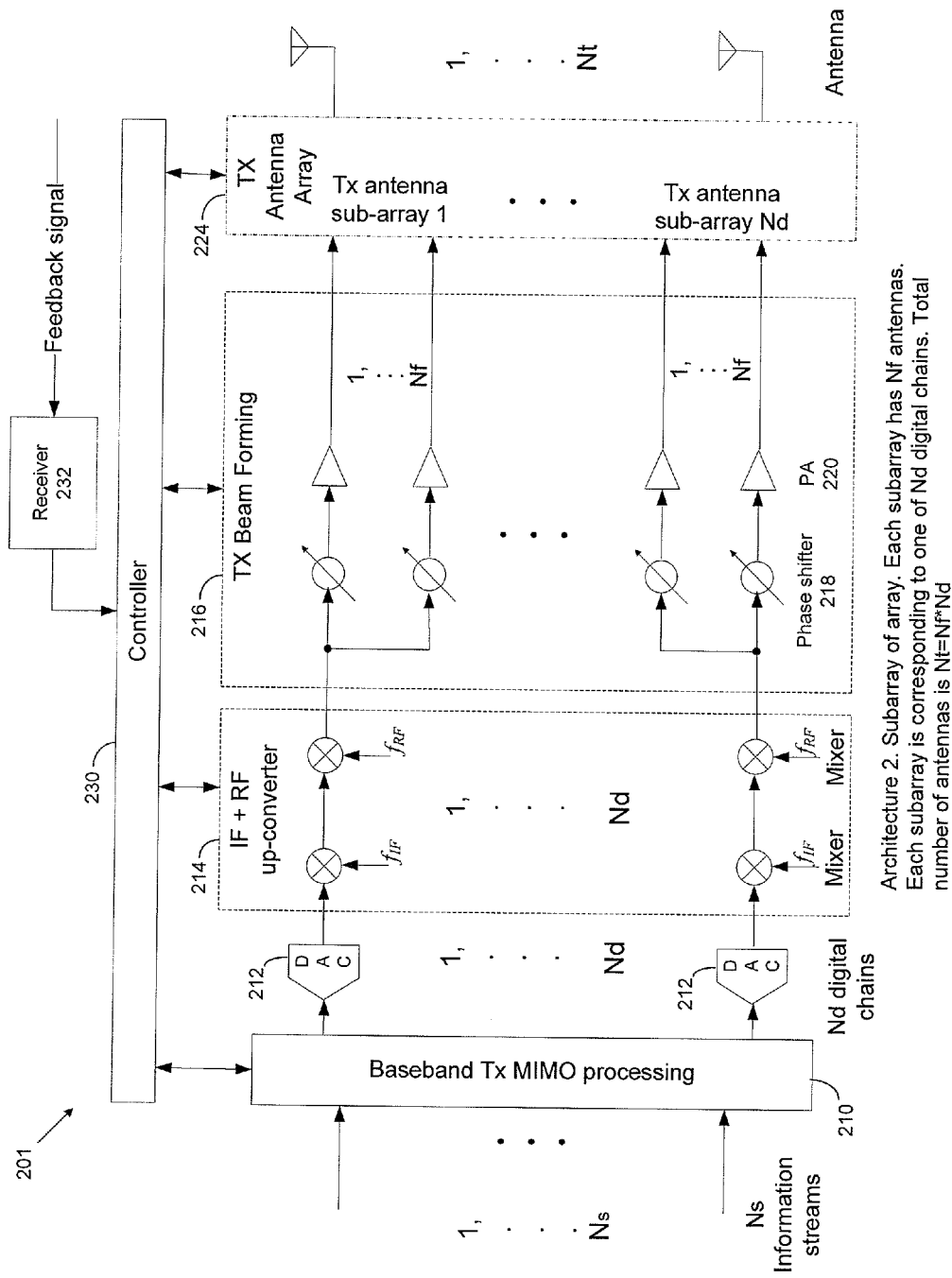

Transceiver Architecture for Systems with Large Number of Antennas:

In current MIMO systems, corresponding to each antenna (at the transmitter, or, at the receiver), there is a separate chain including the data converter and RF components (e.g., mixer, filter, etc.). For large MIMO systems, such an architecture appears prohibitive, due to the associated cost of the data converters and the RF components. Exemplary architectures that alleviate this bottleneck are depicted in FIGS. 2A and 2B (for the transmitter) and FIGS. 2C and 2D (for the receiver). Considering FIGS. 2A and 2B, and referring to the "DAC+ (IF+RF) Upconverter" as a "digital chain", the transmitter is equipped with only a limited number of digital chains ($N_d$,), which is expected to be significantly smaller than the total number of antennas ($N_t$). The connections between the digital chains and the antennas could be realized in either of the two ways: a fully connected architecture, in which a particular digital chain is connected to all the antennas (FIG. 2A), or, an array of subarrays architecture, in which a particular digital chain is connected to only a subset of the antennas (FIG. 2B).

Uplink Synchronization in Cellular Systems:

In cellular mobile communication systems employing multiple access techniques (e.g., orthogonal frequency division multiple access (OFDMA) in 3GPP LTE/LTE-A), it is important that, when different mobile stations transmit data on the uplink channel (MS to BS), the transmissions are synchronized to ensure that the data from different MSs is received by the BS at the same time. This maintains orthogonality between the different mobile stations multiplexed across frequency, and also avoids potential collisions between MSs transmitting at different time instants.

Figure 3:
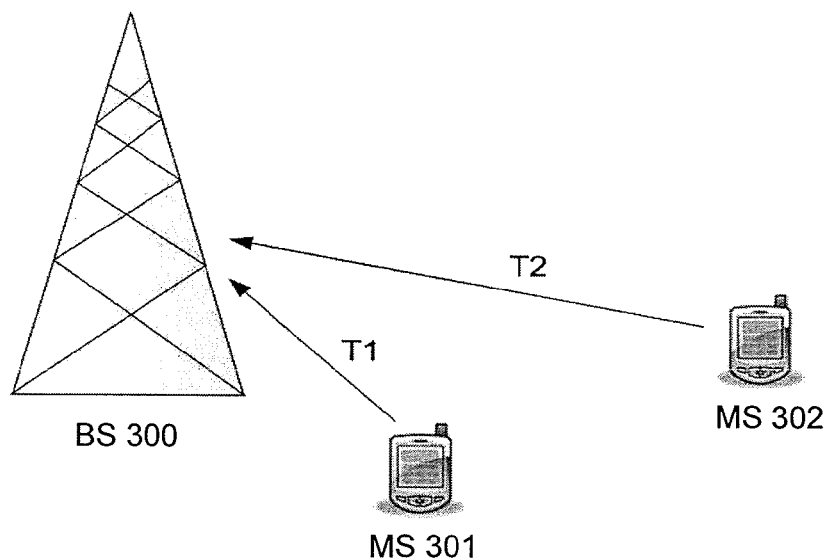
FIG. 3 illustrates an example of different propagation delays in a wireless communication system.

The need for explicitly ensuring synchronization on the uplink transmission arises in part because different MSs have different locations relative to the BS, and hence the data transmitted by them undergoes different propagation delays. FIG. 3 shows an exemplary scenario, where MS 301 and MS 302 transmit to BS 300. Since MS 301 is located closer to BS 300 than MS 302, the data from MS 301 undergoes a smaller propagation delay, and hence, without any timing adjustments, is expected to be received at BS 300 before the data from MS 302 reaches BS 300.

Figure 4:
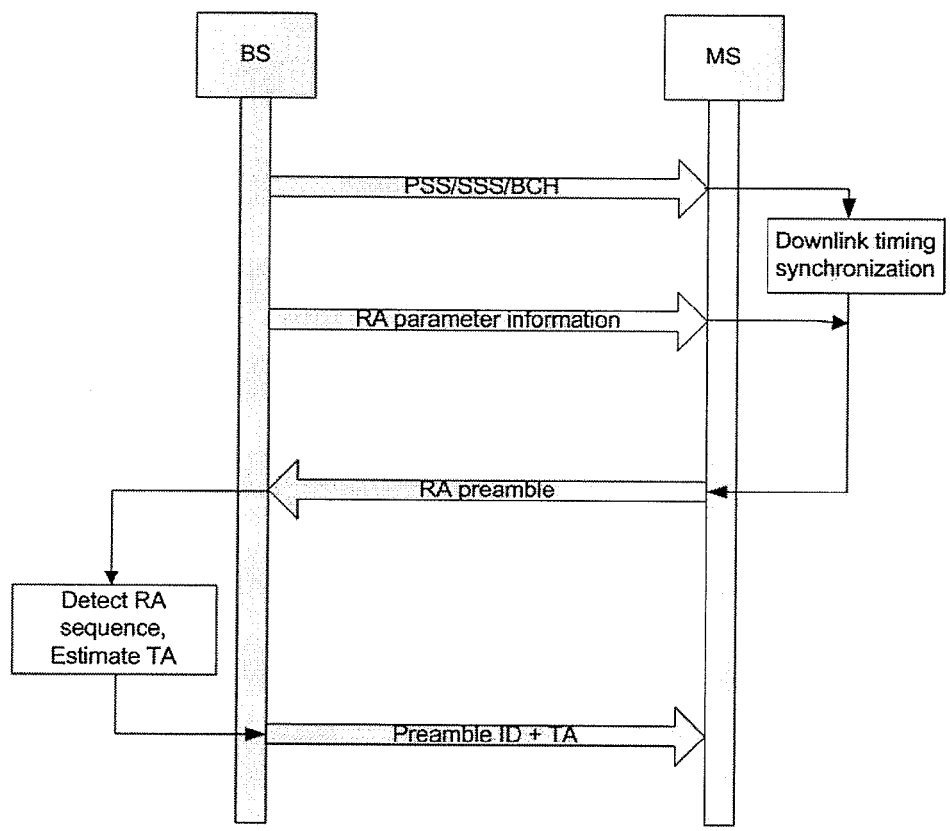
FIG. 4 illustrates a procedure for estimating a timing advance.

A practical approach to ensure uplink timing synchronization is for each MS to adjust its timing before transmitting data to the BS. This is referred to as timing advance (TA). In communication systems such as LTE, the BS advises the MS on the appropriate TA that the MS should employ. One procedure for estimation of the timing advance is illustrated in FIG. 4, which is adapted from REF3. Initially (e.g., upon network entry, or upon waking up from the sleep mode, or when the MS performs handoff from one cell to another), the MS acquires downlink timing synchronization using the synchronization and broadcast channels (primary synchronization channel, secondary synchronization channel, broadcast channel, PSCH/SSCH/BCH). Subsequently, the MS acquires system specific information, including information on parameters for randomly accessing the uplink channel, and then, performs the random access preamble transmission on the uplink channel. The timing of the random access preamble sequence received by the BS allows the BS to estimate the appropriate timing advance that the MS employs before uplink transmission. The BS then sends a random access response, indicating the successfully received preamble and the corresponding TA value. The MS receives this response from the BS, and if the preamble number in the response matches the one used by the MS for its transmission, the MS determines that its preamble transmission was successful, and uses the received TA value for future uplink transmission. It is noted that when the MS first performs the random access preamble transmission, it is not synchronized on the uplink, and hence a guard time may be added to avoid collisions with other transmissions.

In a mmwave mobile broadband communication system, the BS and MS may communicate using directional beams, as described in greater detail below. For instance, the BS may pick one (or more) of the several possible directions in which it can beamform. Similarly, the MS may pick one (or more) of the several directions in which it can beamform. In other words, the uplink communication may be performed using any particular combination(s) of the MS beam direction and BS beam direction. Further, due to mobility considerations, and due to the relatively narrow beam widths, it is expected that the beam pair or pairs used for communication may switch at a rapid rate. Since the timing advance value required for different beam pairs can be different (e.g., due to different propagation delays), to perform rapid beam switching, the MS may acquire new timing advance values at a rapid rate. This can potentially induce excessive overhead, and lead to an increased collision rate on the random access channel. An alternative mechanism, wherein the MS acquires the TA value for all beam pair combinations upfront by performing RACH preamble transmissions corresponding to all beam pair combinations, clearly has the same issue.

Embodiments of this disclosure illustrate methods to overcome this bottleneck. As described in detail below, it is possible for the MS to acquire the TA value for all beam pair combinations using the TA value provided by the BS for any one of the combinations.

FIG. 1 illustrates a wireless communication network, according to embodiments of this disclosure. The embodiment of wireless communication network 100 illustrated in FIG. 1 is for illustration only. Other embodiments of the wireless communication network 100 could be used without departing from the scope of this disclosure.

In the illustrated embodiment, the wireless communication network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based system (not shown).

Base station 102 provides wireless broadband access (via base station 101) to Internet 130 to a first plurality of subscriber stations (also referred to herein as mobile stations) within coverage area 120 of base station 102. Throughout this disclosure, the term mobile station (MS) is interchangeable with the term subscriber station (SS) and the term user equipment (UE). The first plurality of subscriber stations includes subscriber station 111, which may be located in a small business (SB), subscriber station 112, which may be located in an enterprise (E), subscriber station 113, which may be located in a Wi-Fi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Each base station 101-103 can have a globally unique base station identifier (BSID). A BSID is often a MAC (media access control) ID. Each base station 101-103 can have multiple cells (e.g., one sector can be one cell), each with a physical cell identifier, or a preamble sequence, which is often carried in the synchronization channel.

While only six subscriber stations are depicted in FIG. 1, it is understood that the wireless communication network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. For example, subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

A base station (BS) can have one or multiple cells. Within each cell, the BS can use one of more antennas or antenna arrays to carry out beamforming. Similarly, the MS can use one or more antennas or antenna arrays to perform beamforming. The beams formed by the BS and the MS can be in various shapes, or can have various beam patterns. The beam shapes or the beam patterns can be regular or irregular, e.g., pencil beam shape, cone beam shape, irregular main lobe with side lobes, and the like. The beams can be formed, transmitted, received, using, e.g., the transmit paths and the receive paths in FIGS. 2A through 2D.

FIG. 2A illustrates a transmit path for multiple input multiple output (MIMO) baseband processing and analog beam forming with a large number of antennas, according to embodiments of this disclosure. The transmit path 200 includes a beam forming architecture in which all of the signals output from baseband processing are fully connected to all the phase shifters and power amplifiers (PAs) of the antenna array.

As shown in FIG. 2A, Ns information streams are processed by a baseband processor (not shown), and input to the baseband TX MIMO processing block 210. After the baseband TX MIMO processing, the information streams are converted at a digital and analog converter (DAC) 212, and further processed by an interim frequency (IF) and radio frequency (RF) up-converter 214, which converts the baseband signal to the signal in RF carrier band. In some embodiments, one information stream can be split to I (in-phase) and Q (quadrature) signals for modulation. After the IF and RF up-converter 214, the signals are input to a TX beam forming module 216.

FIG. 2A shows one possible architecture for the beam forming module 216, where the signals are fully connected to all the phase shifters and power amplifiers (PAs) of the transmit antennas. Each of the signals from the IF and RF up-converter 214 can go through one phase shifter 218 and one PA 220, and via a combiner 222, all the signals can be combined to contribute to one of the antennas of the TX antenna array 224. In FIG. 2A, there are Nt transmit antennas in the TX array 224. Each antenna can have one or multiple antenna elements. Each antenna transmits the signal over the air. A controller 230 can interact with the TX modules including the baseband processor, IF and RF up-converter 214, TX beam forming module 216, and TX antenna array module 224. A receiver module 232 can, receive feedback signals and the feedback signals can be input to the controller 230. The controller 230 can process the feedback signal and adjust the TX modules.

FIG. 2B illustrates another transmit path for MIMO baseband processing and analog beam forming with a large number of antennas, according to embodiments of this disclosure. The transmit path 201 includes a beam forming architecture in which a signal output from baseband processing is connected to the phase shifters and power amplifiers (PAs) of a sub-array of the antenna array. The transmit path 201 is similar to the transmit path 200 of FIG. 2A, except for differences in the beam forming module 216.

As shown in FIG. 2B, the signal from the baseband is processed through the IF and RF up-converter 214, and is input to the phase shifters 218 and power amplifiers 220 of a sub-array of the antenna array 224, where the sub-array has Nf antennas. For the Nd signals from baseband processing (e.g., the output of the MIMO processing), if each signal goes to a sub-array with Nf antennas, the total number of transmitting antennas Nt should be Nd*Nf. The transmit path 201 includes an equal number of antennas for each sub-array. However, the disclosure is not limited thereto. Rather, the number of antennas for each sub-array need not be equal across all sub-arrays.

The transmit path 201 includes one output signal from the MIMO processing as the input to the RF processing with one sub-array of antennas. However, this disclosure is not limited thereto. Rather, one or multiple signals out of the Nd signals from base band processing (e.g., the output of the MIMO processing) can be the inputs to one of the sub-arrays. When multiple output signals from the MIMO processing are as the inputs to one of the sub-arrays, each of the multiple output signals from the MIMO processing can be connected to part of or all of the antennas of the sub-array. For example, the RF and IF signal processing with each of the sub-array of antennas can be the same as the processing with the array of antennas as in FIG. 2A, or any type of the RF and IF signal processing with an array of antennas. The process related to one sub-array of the antennas may be referred to as one "RF chain".

Figure 2C:
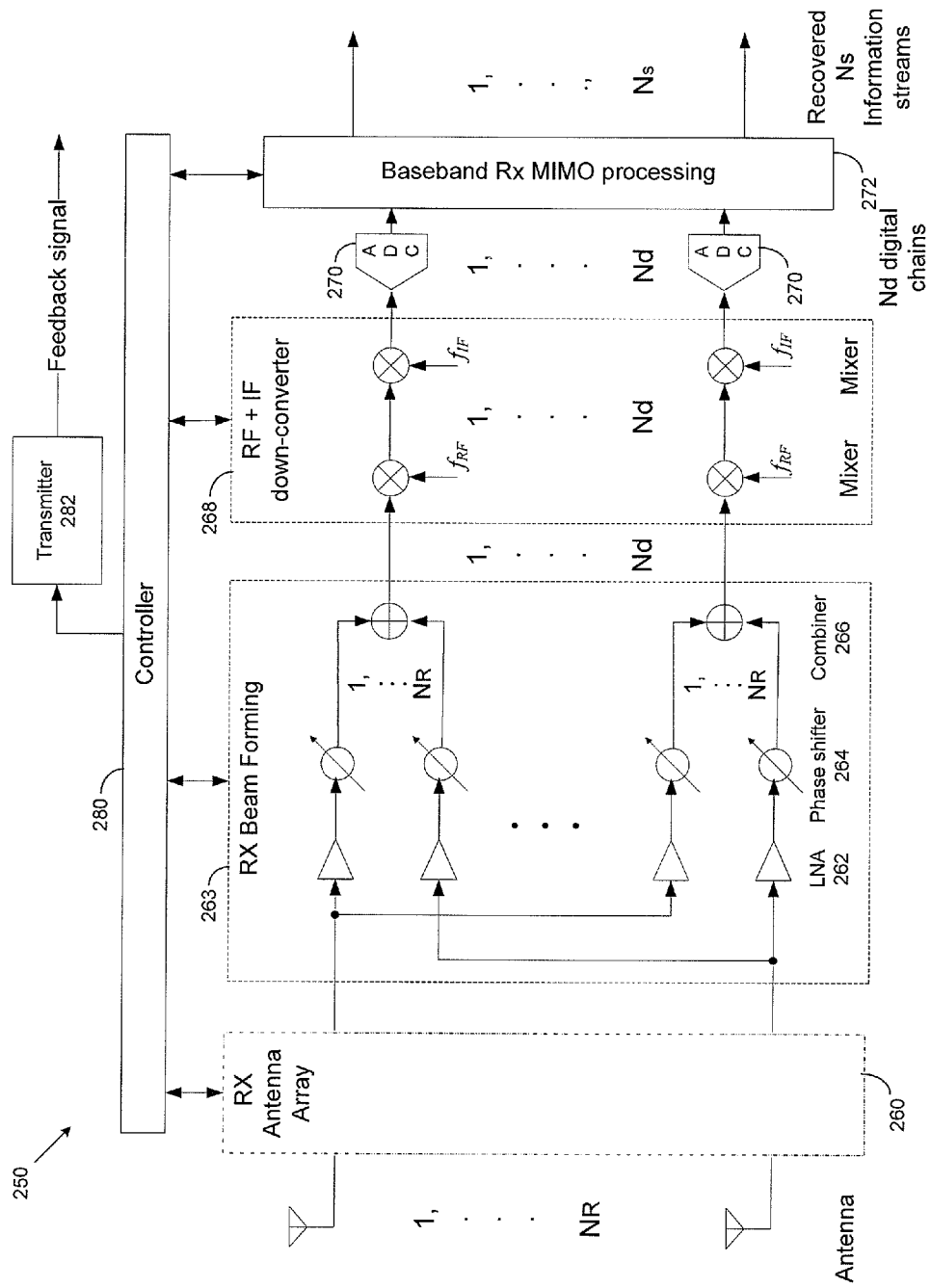
FIGS. 2C and 2D illustrate receive paths for MIMO baseband processing and analog beam forming with a large number of antennas, according to embodiments of this disclosure.

FIG. 2C illustrates a receive path for MIMO baseband processing and analog beam forming with a large number of antennas, according to embodiments of this disclosure. The receive path 250 includes a beam forming architecture in which all of the signals received at the RX antennas are processed through an amplifier (e.g., a low noise amplifier (LNA)) and a phase shifter. The signals are then combined to form an analog stream that can be further converted to the baseband signal and processed in a baseband.

As shown in FIG. 2C, NR receive antennas 260 receive the signals transmitted by the transmit antennas over the air. Each receive antenna can have one or multiple antenna elements. The signals from the RX antennas are processed through the LNAs 262 and the phase shifters 264. The signals are then combined at a combiner 266 to form an analog stream. In total, Nd analog streams can be formed. Each analog stream can be further converted to the baseband signal via a RF and IF down-converter 268 and an analog to digital converter (ADC) 270. The converted digital signals can be processed in a baseband RX MIMO processing module 272 and other baseband processing, to obtain the recovered NS information streams. A controller 280 can interact with the RX modules including baseband processor, RF and IF down-converter 268, RX beam forming module 263, and RX antenna array module 260. The controller 280 can send signals to a transmitter module 282, which can send a feedback signal. The controller 280 can adjust the RX modules and determine and form the feedback signal.

Figure 2D:
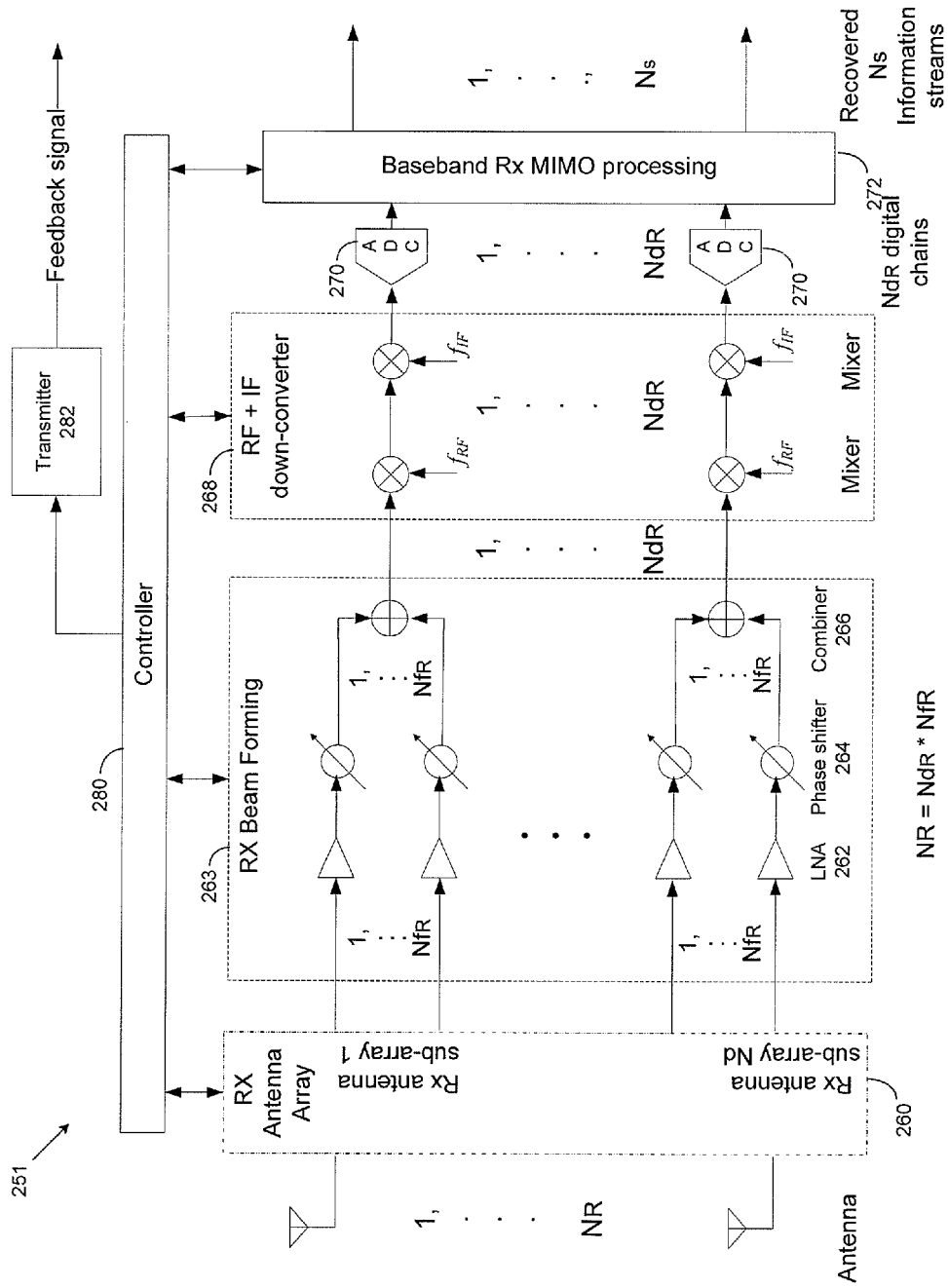

FIG. 2D illustrates another receive path for MIMO baseband processing and analog beam forming with a large number of antennas, according to embodiments of this disclosure. The receive path 251 includes a beam forming architecture in which the signals received by a sub-array of the antenna array can be processed by amplifiers and phase shifters, to form an analog stream that can be converted and processed in the baseband. The receive path 251 is similar to the receive path 250 of FIG. 2C, except for differences in the beam forming module 263.

As shown in FIG. 2D, the signals received by NfR antennas of a sub-array of the antenna array 260 are processed by the LNAs 262 and phase shifters 264, and are combined at combiners 266 to form an analog stream. There can be NdR sub-arrays (NdR=NR/NFR), with each sub-array forming one analog stream. Hence, in total, NdR analog streams can be formed. Each analog stream can be converted to the baseband signal via a RF and IF down-converter 268 and an ADC 270. The NdR digital signals are processed in the baseband module 272 to recover the Ns information streams. The receive path 251 includes an equal number of antennas for each sub-array. However, the disclosure is not limited thereto. Rather, the number of antennas for each sub-array need not be equal across all sub-arrays.

The receive path 251 includes one output signal from the RF processing with one sub-array of antennas, as one of the inputs to the baseband processing. However, this disclosure is not limited thereto. Rather, one or multiple output signals from the RF processing with one sub-array of antennas, can be the inputs to the baseband processing. When multiple output signals from the RF processing with one sub-array of antennas are the inputs, each of the multiple output signals from the RF processing with one sub-array of antennas, can be connected to part of or all of the antennas of the said sub-array. For example, the RF and IF signal processing with each of the sub-array of antennas can be the same as the processing with the array of antennas as in FIG. 2C, or any type of the RF and IF signal processing with an array of antennas. The process related to one sub-array of the antennas can be referred to as one "RF chain".

In other embodiments, there can be other transmit and receive paths which are similar to the paths in FIGS. 2A through 2D, but with different beam forming structures. For example, the power amplifier 220 can be after the combiner 222, so the number of amplifiers can be reduced.

Figure 5:
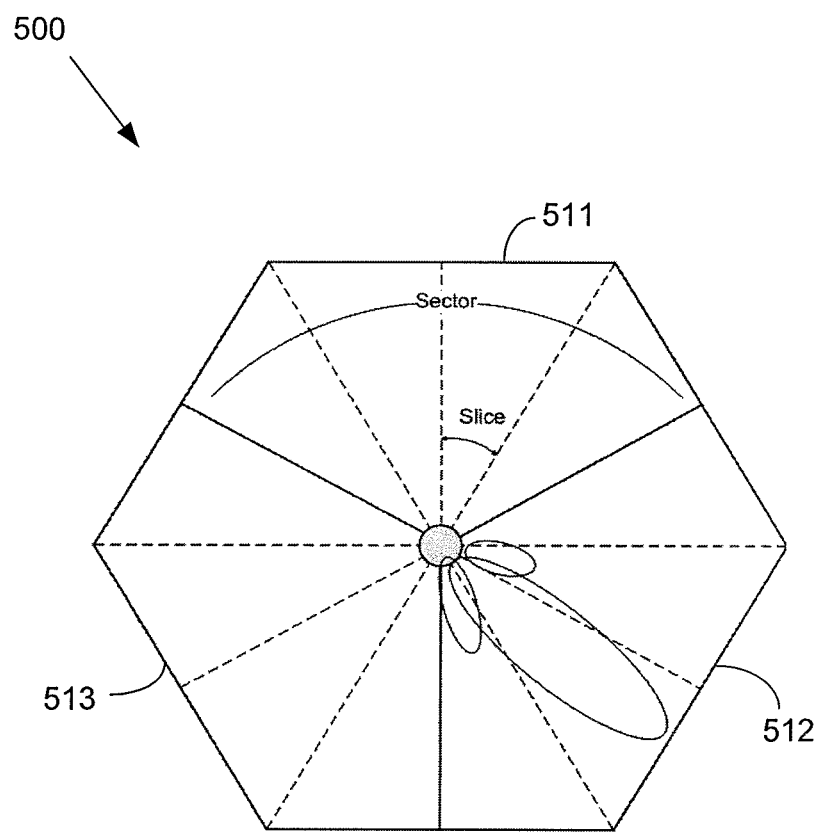
FIG. 5 illustrates beamforming at a base station in a directional communication system, according to an embodiment of this disclosure.

FIG. 5 illustrates beamforming at a base station in a directional communication system, according to an embodiment of this disclosure. The embodiment of base station 500 illustrated in FIG. 5 is for illustration only. Other embodiments of base station 500 could be used without departing from the scope of this disclosure.

Base station 500 includes a coverage area that is divided into three sectors 511-513. Each sector in the coverage area is divided into sub-sectors, or slices. Base station 500 can form and steer beams to lie within any of the slices. The number of slices in the example depicted in FIG. 5 is four slices in each sector 511-513. However, the number of sectors and slices may vary and could be any suitable number. In a similar manner, a mobile station in communication with base station 500 is also capable of forming and steering beams within one of a given number of directions. As an example, in this disclosure, it is assumed that a mobile station is configured with four possible beamforming directions. However, the number of directions at the mobile station may be any other suitable number.

Figure 6:
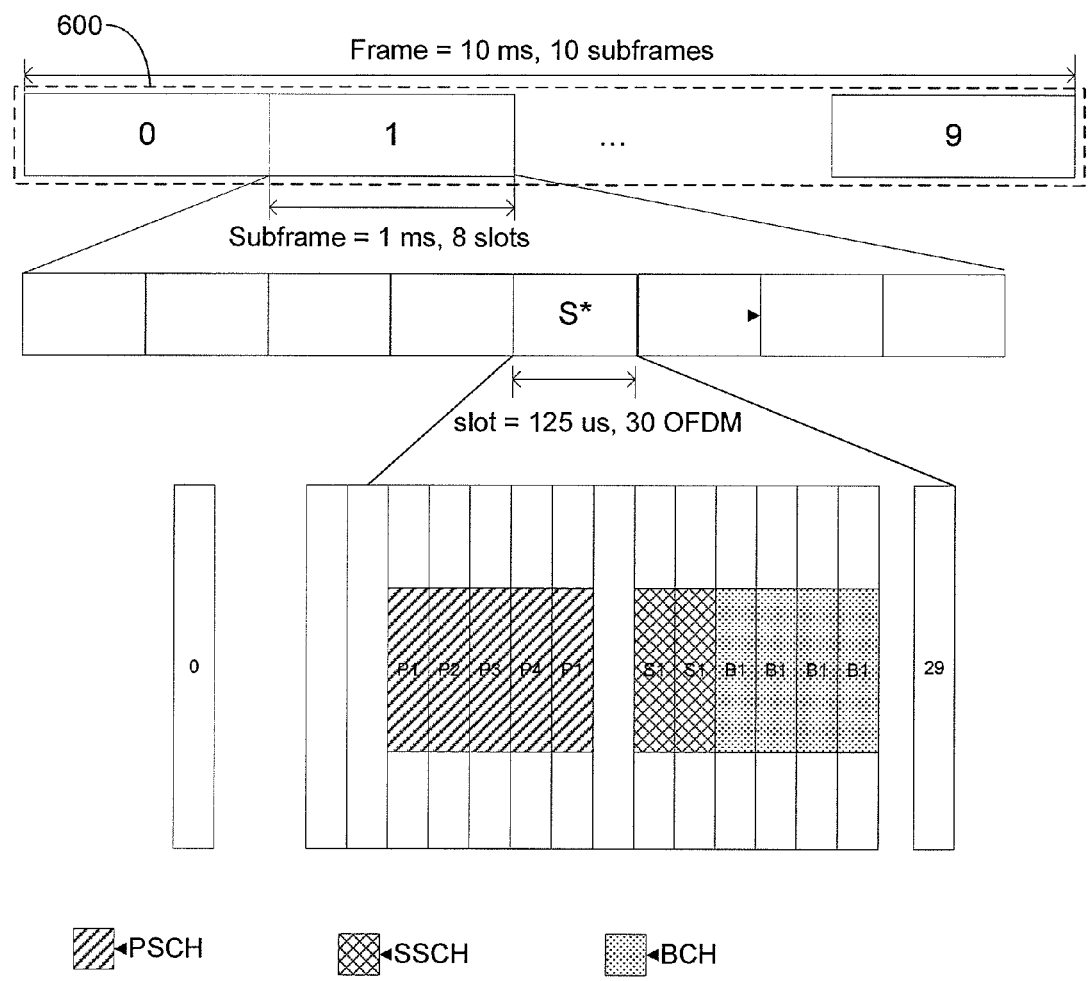
FIG. 6 depicts an example frame structure in a directional communication system, according to an embodiment of this disclosure.

FIG. 6 depicts an example frame structure in a directional communication system, according to an embodiment of this disclosure. The embodiment of frame 600 illustrated in FIG. 6 is for illustration only. Other embodiments of frame 600 could be used without departing from the scope of this disclosure.

Figure 7:
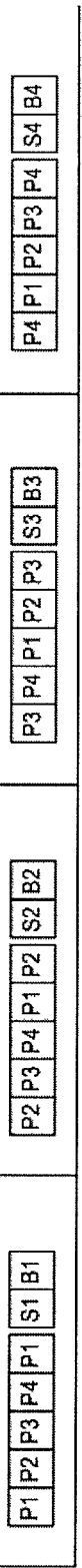
FIG. 7 illustrates a primary synchronization channel (PSCH) symbol sequence when a BS cyclically shifts the sequence of slices across the subframes, according to an embodiment of this disclosure.

Frame 600 has a duration of 10 ms, and comprises 10 subframes, each subframe having a 1 ms duration. Each subframe consists of 8 slots, and each slot includes 30 OFDM symbols. The BS transmits one OFDM symbol as the primary synchronization channel (PSCH) in each slice once every subframe. In each subframe, after transmitting one PSCH symbol in each slice, the BS transmits one extra PSCH OFDM symbol to resolve the starting-at-the-edge problem. (See also REF4). FIG. 6 shows an example on the placement of PSCH symbols in the BS timing frame. Given four slices in the sector, the BS transmits five PSCH symbols in each subframe. These symbols are transmitted in the fifth slot and next to each other (e.g., on OFDM symbols N-11 to N-7 in the fifth slot, where N=30 is the number of symbols in the slot). In the example shown in FIG. 6, in Subframe 1, the first PSCH symbol is transmitted in Slice 1 (labeled P1), followed by a PSCH symbol in Slice 2, Slice 3, Slice 4, then Slice 1 (labeled P2, P3, P4, P1, respectively). In the following subframes, the BS may send PSCH symbols in the same order (P1, P2, P3, P4, P1), or in another order, such as cyclically shifting the sequence from one subframe to the next. FIG. 7 shows, for example, the PSCH symbol sequence when the BS cyclically shifts the sequence of slices across the subframes. In the examples shown in FIGS. 6 and 7, the cyclic shift is applied to the sequence of first 4 slices, and the last slice is just selected to be the same as the first slice.

In addition to the primary synchronization symbols, the BS also transmits a secondary synchronization channel (SSCH). In the example in FIG. 6, the SSCH includes two OFDM symbols, is located immediately after the PSCH symbols in each subframe, and it is transmitted in the same slice as the last PSCH symbol transmitted in that subframe. Moreover, the broadcast channel (BCH) immediately follows the SSCH and is transmitted on the same slice as the SSCH. In this example, the BCH is transmitted in four OFDM symbols following the SSCH.

To obtain downlink synchronization, the MS can fix its receive beam within each subframe, and switch the receive beams across subframes. In this way, the MS is able to sweep through all possible combinations of the BS beam direction (i.e., slice) and MS beam direction.

In the preceding discussion, it has been assumed that the BS and the MS can beamform in only one direction at a particular time. If the BS or the MS have the capability to beamform in multiple directions simultaneously (e.g., using a multiple number of the sub-arrays, depicted in FIGS. 2B and 2D), it is possible to reduce the synchronization overhead. For instance, if the MS could beamform in all four directions simultaneously, synchronization symbol transmission and reception across all beam pair combinations can be performed within one subframe only. If the BS has the capability to beamform in multiple directions simultaneously (e.g., using multiple sub-arrays in FIG. 2B), it can simultaneously transmit synchronization symbols in different slices from the different sub-arrays. Such schemes, however, must be implemented carefully to avoid interference within beam directions (see REF4).

Figure 8:
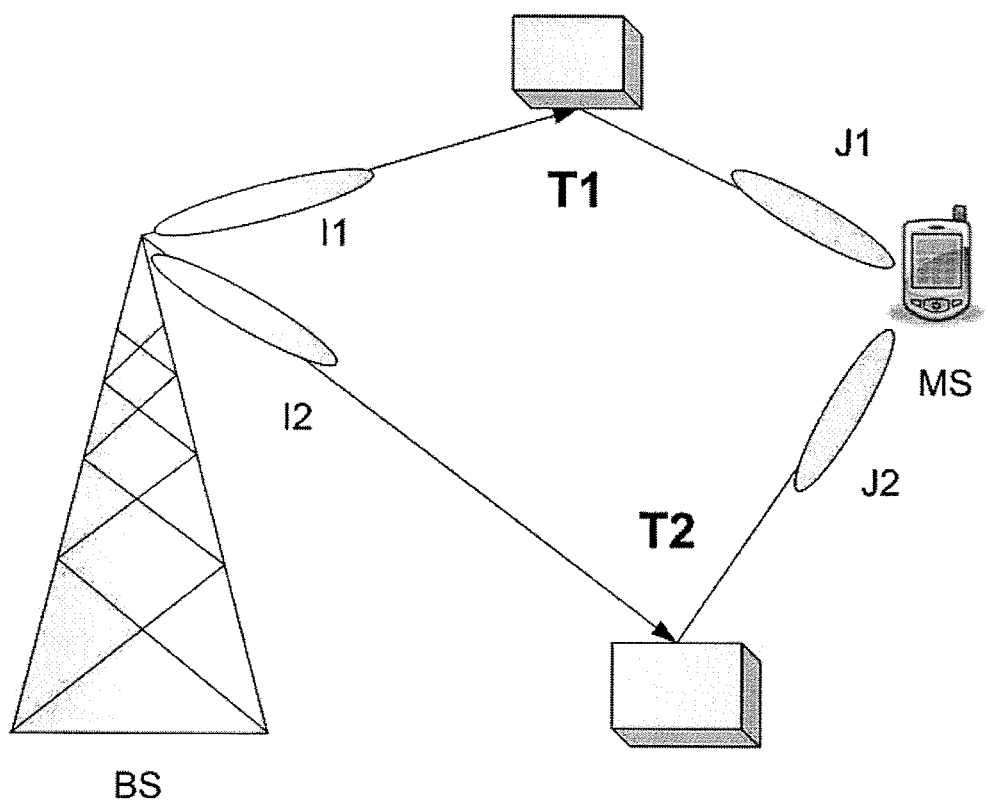
FIG. 8 illustrates an example scenario where propagation delay is dependent on the beam directions used for communication, according to an embodiment of this disclosure.

The downlink timing that the MS obtains for a particular (BS beam, MS beam) pair is dependent on the propagation delay encountered in transmission using this beam pair. Hence, the downlink timing obtained at the MS for different beam pairs is expected to be different. For instance, FIG. 8 illustrates an example scenario where propagation delay is dependent on the beam directions used for communication. In FIG. 8, the propagation delays corresponding to two beam pairs with indices (I1, J1) and (I2, J2) are depicted. Since the timing advance needed to communicate on the uplink (MS to BS) is also closely linked to the propagation delay, it is expected that the TA values required for different combinations of beam pairs are also different.

For uplink communication, the selected (MS beam, BS beam) pair may be the one that provides the best link quality, measured, for instance, in terms of the link SNR (signal to noise ratio). However, it is possible that the communication happens over another beam pair or pairs (e.g., due to constraints imposed by the need to schedule other mobile stations as well). Moreover, the beam pair over which the communication occurs may change with time, e.g., due to mobility of the MS. Thus, it is desirable that the MS knows the Timing Advance to be used for different pair combinations.

Embodiments of this disclosure provide methods by which the MS can acquire the TA values corresponding to different beam pairs, without using RACH transmission for all beam pairs. It requires significant overhead on the system for the MS to acquire the TA corresponding to all beam pair combinations using RACH transmission for all beam pairs. First, a method is disclosed by which it is possible for the MS to acquire the TA for all beam pair combinations using the TA for only one of the combinations. In other words, to obtain the TA for different beam pairs, the MS need not perform RACH preamble transmission to the BS for all combinations separately. This is illustrated for the scenario where the MS obtains the TA for one particular beam pair, based on the knowledge of the TA for one other beam pair. The TA for the remaining beam pairs can be obtained in a similar manner.

As described above, based on the downlink PSCH/SSCH/BCH transmission, the MS may first obtain downlink timing for the different beam pair combinations. Turning again to FIG. 8, two beam pairs are shown. Beam pair 1 includes the beams indexed by the indices (I1, J1) at the BS and the MS respectively, while beam pair 2 includes the beams indexed by (I2, J2). The corresponding propagation delays are denoted by T1 and T2 units of time, respectively.

It is assumed that the MS attempts to acquire the TA for the pair (I1, J1) using RACH preamble transmission. This transmission is performed based on the downlink timing T1 that the MS has already acquired for the (I1, J1) pair. Further, the uplink RACH transmission is expected to encounter a similar propagation delay as the downlink synch channel transmission, i.e., a propagation delay of T1 units. Consequently, the arrival of the RACH preamble at the BS is expected to be delayed by 2*T1 units (the round trip propagation delay) of time, compared to what the arrival time would have been had there be no propagation delays (see also FIG. 9, described in greater detail below). In other words, the reception of the RACH preamble at the BS has a timing offset of 2*T1 units, when measured by the clock at the BS.

It is assumed that, based on the reception of the RACH preamble, the BS directs the MS to advance its timing for the (I1, J1) beam pair by TA1 units of time. Hence, when the MS uses this timing advance for uplink data transmission using the (I1, J1) pair, the timing offset at the BS becomes (2*T1−TA1) units. In some embodiments, the BS directs a timing offset that is exactly equal to 2*T1 (i.e., TA1=2*T1), so that the offset is 0. However, the primary aim of the timing advance is to ensure that the different receptions are aligned at the BS, which may actually be accomplished even if the timing offset is not exactly equal to 2*T1.

Likewise, if the timing advance that the MS were to use on the beam pair (I2, J2) is denoted as TA2, then the timing offset at the BS, when (I2, J2) is used for uplink data transmission, is (2*T2−TA2) units, where T2 denotes the propagation delay encountered on the (I2, J2) pair. Consequently, to ensure that the uplink transmissions using these two beam pairs are aligned at the BS, it is desired to have $$(2*T1-TA1)=(2*T2-TA2).$$

Solving for TA2 provides $$TA2=TA1+2*(T2-T1) \rightarrow TA2=TA1+2\Delta T,$$

where $\Delta T=T2-T1$.

Figure 9:
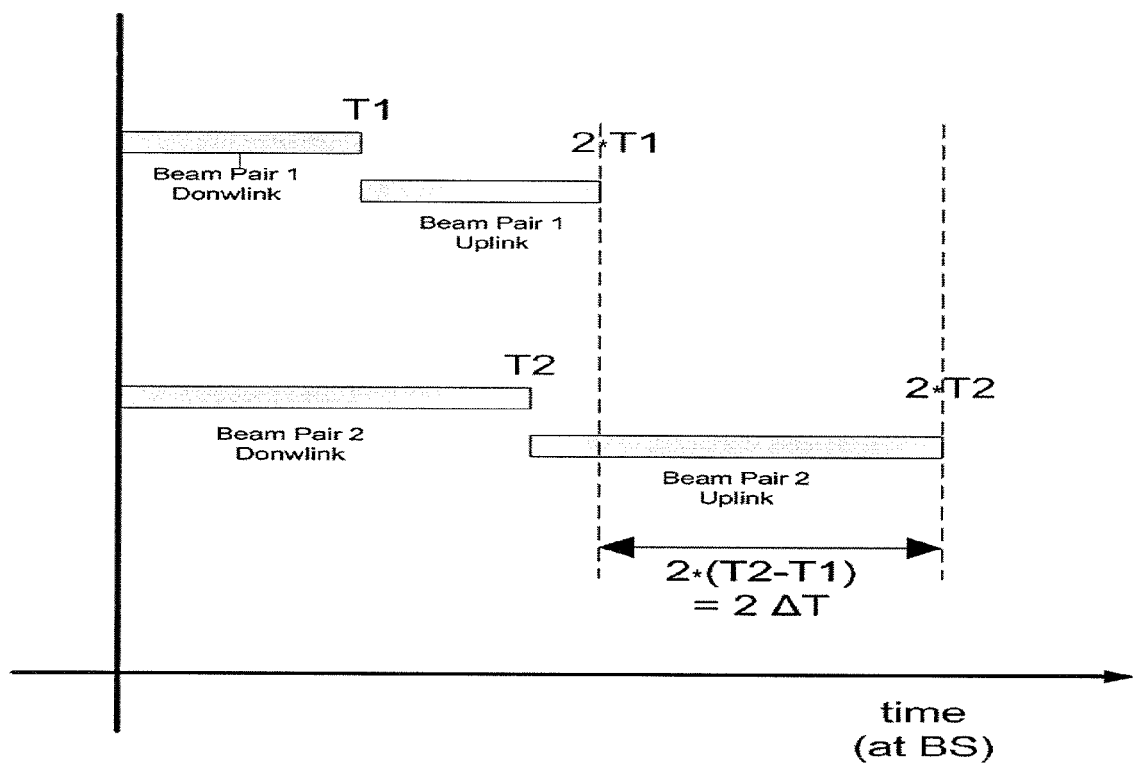
FIG. 9 illustrates a timing misalignment at the base station in the absence of any timing advance, according to an embodiment of this disclosure.

Thus, if the downlink timings for both beam pairs (i.e., T1 and T2) are already available at the MS (e.g., from downlink synch channel transmission), then the MS can determine the desired TA2 value from the TA1 value provided by the BS, eliminating the need to perform a RACH preamble transmission to obtain TA2. FIG. 9 illustrates the concept.

FIG. 9 illustrates a timing misalignment at the base station in the absence of any timing advance, according to an embodiment of this disclosure. The embodiment illustrated in FIG. 9 is for illustration only. Other embodiments could be used without departing from the scope of this disclosure.

As shown in FIG. 9, without any timing advance from the MS, uplink transmission using beam pair 1 would be received at the BS with an offset of 2*T1 units, while uplink transmission using beam pair 2 would be received at the BS with an offset of 2*T2 units. Consequently, the relative offset between the two arrivals at the BS is 2*(T2−T1)=2ΔT. Hence, to ensure that the two arrivals occur at the same time, the MS needs to transmit beam pair 2 with a TA that is 2 ΔT more than the TA used for beam pair 1. It is noted that FIG. 9 depicts a scenario where T2>T1. It will be understood that the same analysis applies if T2<=T1, in which case ΔT<=0.

The procedure described above can be generalized to obtain the TA value for any beam pair using only TA1. Specifically, if the propagation delay (i.e., the downlink timing) for a particular beam pair is denoted as T0, then the corresponding desired TA value, denoted as TA0, is:

$$TA0=TA1+2*(T0-T1).$$

This method enables the computation of the TA for any desired beam pair, using the TA for a given beam pair. From a design perspective, this method may be incorporated in several different scenarios, as described below.

Figure 10:
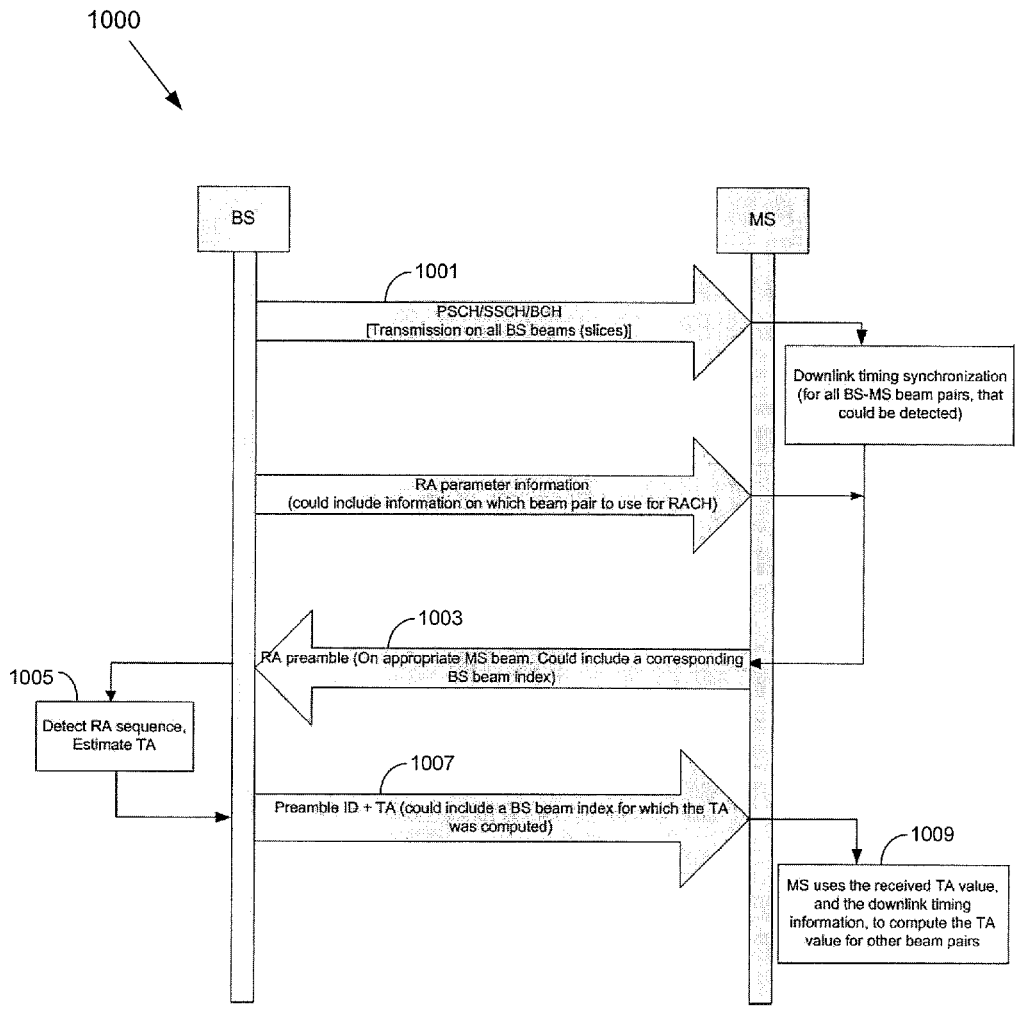
FIG. 10 illustrates an example timing advance method in a millimeter wave system, according to one embodiment of this disclosure.

FIG. 10 illustrates an example timing advance method in a millimeter wave system, according to one embodiment of this disclosure. The embodiment of method 1000 illustrated in FIG. 10 is for illustration only. Other embodiments could be used without departing from the scope of this disclosure.

In the embodiment shown in FIG. 10, the MS maintains a set of the downlink timing information for the different beam pair combinations, e.g., in a table or other suitable data format. This set contains downlink timing values obtained using the downlink synch channel (PSCH/SSCH/BCH) (operation 1001). Upon network entry, or upon waking up from the sleep mode, or when the MS has lost downlink timing, the MS can update the entries in the table. While obtaining the downlink timing, the MS may also assess the quality of the links (e.g., link SNR) on the different beam pair combinations. This enables the MS to obtain the best beam pair, and use the corresponding MS beam (in the best pair) to transmit the RACH preamble, at the appropriate RACH opportunity (which may be known, based on information provided by the BS) (operation 1003).

While transmitting the RACH preamble, the MS may also explicitly indicate the indices of the strongest beam pair to the BS. This may be useful at the BS to determine which BS beam (slice) to consider when computing the TA value. Upon reception of the RACH preamble, the BS determines the desired timing advance value (operation 1005), and sends the value to the MS (operation 1007). The BS may also send a message verifying the beam index used by the BS to obtain the TA value. Once the MS receives the TA value, the MS can determine the TA for the other beam pairs using the set of downlink timing values stored at the MS (operation 1009). For instance, Tables 1 and 2 depict example sets, stored at the MS, of downlink timing values and TA values for the different beam pair combinations, assuming 4 possible beams (slices) at the BS and 4 possible beams at the MS. Of course, there may be more or fewer beams/slices at the BS, the MS, or both.

TABLE 1

Set of downlink timing values corresponding to the different beam pairs

| BS beam index | MS beam index | | | |
|---|---|---|---|---|
| | 1 | 2 | 3 | 4 |
| 1 | T1, 1 | T1, 2 | T1, 3 | T1, 4 |
| 2 | T2, 1 | T2, 2 | T2, 3 | T2, 4 |
| 3 | T3, 1 | T3, 2 | T3, 3 | T3, 4 |
| 4 | T4, 1 | T4, 2 | T4, 3 | T4, 4 |

TABLE 2

Set of Timing Advance (TA) values corresponding to the different beam pairs

| BS beam index | MS beam index | | | |
|---|---|---|---|---|
| | 1 | 2 | 3 | 4 |
| 1 | TA1, 1 | TA1, 2 | TA1, 3 | TA1, 4 |
| 2 | TA2, 1 | TA2, 2 | TA2, 3 | TA2, 4 |
| 3 | TA3, 1 | TA3, 2 | TA3, 3 | TA3, 4 |
| 4 | TA4, 1 | TA4, 2 | TA4, 3 | TA4, 4 |

If the BS can beamform in all possible directions simultaneously, then a single RACH transmission from the MS may suffice to obtain the TA value for a desired beam pair. If the BS cannot beamform in all directions simultaneously, the BS may determine the TA using a particular BS beam (which may or may not be the desired beam from the MS perspective), and indicate the BS beam to the MS when sending the TA information. Alternatively, if the beam used by the BS does not match the desired beam indicated by the MS, then the BS may not transmit a TA value, and the MS may have to transmit the RACH preamble again until the BS can compute the TA value on a desired BS beam direction. In another alternative, the schedule of the RACH opportunities itself may indicate the BS beam that would be used, so that the MS may send the RACH preamble on an appropriately selected RACH opportunity.

The number of downlink timing values available at the MS may vary over time. For example, some of the beam pairs may have poor instantaneous link quality, such that it is not possible to detect the downlink synchronization channel at all. In this scenario, the MS may determine the TA values for the beam pairs for which the downlink timing is available. The beam pairs for which the link quality is poor may not be used for uplink transmission anyway, thus the TA value may not be needed. Also, the transmission of the RACH preamble may be performed once the MS has scanned the downlink synch channels corresponding to all of the possible beam pairs (for example, if the MS intends to transmit the RACH on the strongest beam pair), or after the MS has scanned the sync channel for only a subset of all the beam pair combinations. In the latter scenario (or even in other scenarios), the MS may keep scanning the downlink synch channel to obtain (or update) the downlink timing information for the different beam pairs, and correspondingly, obtain (or update) the TA values for the different beam pairs.

In an embodiment of this disclosure, the beam on which the MS decides to the send the RACH preamble may not necessarily be the one corresponding to the best beam pair. For instance, the BS may instruct the MS to use a particular beam to send the RACH preamble. This information could be sent, for example, in the RA parameter information that the BS transmits to the mobile stations. Upon reception of the RACH preamble, the BS may then compute the desired TA value, and send it the MS, while also indicating the BS beam (or slice) index that was used to compute the TA value.

In an embodiment of this disclosure, using the already computed TA values, the MS may apply the appropriate TA when uplink data transmission, or uplink reference signal transmission, takes place. The beam pair (or pairs) on which the data transmission takes place may be the best beam pair (or a certain number of best beam pairs), or some other beam pair(s) that are indicated by the BS to the MS, or all the beam pairs (e.g., in case of reference signal transmission).

In an embodiment of this disclosure, a scenario is considered where the beams used for data transmission are switched. This could occur, for instance, due to mobility of the MS. The need for switching beams at the MS may be determined in a variety of ways. For instance, the MS may observe a change in the quality of the channels on the different beam pairs (measured, for example, using the downlink synch channel), and determine to switch beams, after informing the BS about the change in the channel conditions. Alternatively, the BS itself may advise the MS to switch beams. Using the methods disclosed in this disclosure, in the scenario of beam switching, the MS need not perform a RACH preamble transmission, and the BS need not send a TA value to the MS. Rather, the MS may already possess the TA values corresponding to the different beam pairs, and hence may use the appropriate TA value(s) when the beam(s) are switched.

It is noted that methods have been disclosed above to obtain the TA value for different beam pairs, using the TA value for only one of the beam pairs. For instance, all the TA values in Table 2 may be obtained using the TA value TA1,1. However, more generally, this disclosure relates any one particular TA value to any other particular TA value, dependent on the corresponding downlink timings. Hence, it is possible to obtain the TA value for any beam pair from the TA value of any other beam pair, as long as the corresponding downlink timings are available. For instance, TA1,2 may be obtained using TA1,1; likewise, TA1,3 may be obtained using TA1,1 or TA1,2, and so on.

So far, embodiments of this disclosure have illustrated methods wherein the MS may obtain the TA value for all the beam pairs, assuming that it has knowledge of the TA value for one of the beam pairs. This is advantageous from a practical point of view, since it avoids the RACH preamble transmissions for multiple beam pairs. Nonetheless, in an embodiment of this disclosure, the RACH preamble transmission from the MS may be performed for more than one beam pair, and the BS may inform the MS of the TA values for those beam pairs. In such as scenario, the beams on which the MS may send the RACH could be determined by the MS itself (for instance, the K MS beams corresponding to the best K beam pairs), or the BS may instruct the MS to use a certain set of beams. In case the MS picks the K best beam pairs, the MS may also inform the BS about the corresponding BS beams (or slices). In its message(s) indicating the TA values, the BS may inform the MS about the BS beam (or slice) used to obtain each of the TA values.

Returning to the scenario considered earlier in this disclosure, the MS performs RACH preamble transmission on beam pair 1, obtains the corresponding TA1 from the BS, and computes TA2 (the timing advance for beam pair 2), to be:

$$TA2=TA1+2\Delta T,$$

where $\Delta T=T2-T1$ is the difference in the downlink propagation delays (i.e., the downlink timing) for the two beam pairs.

As described above, usually, the TA1 value provided by the BS would equal the round trip propagation delay experienced on the beam pair 1. However, even if the BS is not required to provide this TA1 value, the preceding procedure for computation of TA2 at the MS would still result in uplink timing alignment for beam pairs 1 and 2. It may nonetheless result in the TA2 computation performed by the MS returning a negative value, i.e., TA2<0. While mathematically this is acceptable, since it still ensures uplink timing alignment at the BS, from a physical perspective, it may be desirable for the TA values to be positive. Hence, in an embodiment of this disclosure, it is plausible to consider that the BS report a TA value that is equal to the round trip propagation delay on the beam pair for which the MS transmits the RACH preamble.

The preceding computation of TA2 at the MS assumes that, for a particular beam pair, the downlink propagation delay is equal to the uplink propagation delay. In practice, even though the uplink and downlink propagation delays may not be absolutely identical (e.g., due to some mobility), the difference between them would be negligibly small. In the (unlikely) scenario that the downlink and uplink propagation delays have a large difference, it can also lead to negative values for TA2 at the MS. In such a scenario, if the BS behavior is known to be such that the TA1 value reported by the BS is exactly equal to the round trip propagation delay for beam pair 1 (such that a negative TA2 value in general would not be expected), the MS may chose to ignore the negative value of TA2, and perform the TA2 computation again after updating the value of the downlink propagation delays (T1, or T2, or both), and/or the value of TA1 (e.g., based on RACH preamble transmission).

Although the preceding discussion focuses on computation of the TA2 value, based on the TA1 value, and the downlink propagation delays T1 and T2, this is just an exemplary scenario. The same or similar embodiments are applicable for computation of a TA value of any particular beam pair, based on the TA value of some other particular beam pair, and the corresponding propagation delays.

In an embodiment of this disclosure, the update and tracking of the TA values are considered. Once the MS has obtained the initial TA values, these values may be updated continuously to keep track of the variations in the desired TA values. This can be facilitated, for example, by the BS, based on the measured timing offsets that exist even after the MS has used the appropriate TA value. The BS may use the uplink reference signals (such as the Sounding Reference Signals (SRS)) for this purpose. In accordance with the preceding methods disclosed herein, the BS may send TA updates for all the beam pair combinations, or only a subset of the combinations (possibly just one), in which case, the MS may compute the updates for the other beam pairs by itself.

In an embodiment of this disclosure, a scenario is considered where the beam widths used for communication can be variable. For example, the downlink synch channel transmission may be performed on a set of wide beams, while the uplink data transmission may occur on narrower, more powerful, beams. Even in this scenario, the methods disclosed in this disclosure may be used to obtain the TA for uplink transmission (using narrow beams). This is because, irrespective of the beam widths used, the TA associated with any beam pair (e.g., BP1) may be obtained if the TA for another beam pair (e.g., BP2) is known, and the difference between the downlink propagation delays (or downlink timing) for the two beam pairs is known. Hence, if the initial TA computation is performed using the downlink synch and uplink RACH transmissions (for a pair of wide beams), as illustrated in this disclosure, this TA can still be employed by the MS to compute the TA associated with uplink data transmission using a pair of narrow beams, provided the downlink propagation delay for the narrow beam pair is available. This may be obtained, for example, based on the reception of some downlink pilot symbols that are transmitted on the narrow beams (e.g., CSI-RS). As an alternative, for a narrow beam pair, the MS may use the downlink timing of a wider beam pair (e.g., a wider beam pair that contains the narrow beam pair, if one exists).

So far, in this disclosure, methods have been provided by which the MS may attain the TA values associated with different beam pairs. In particular, methods have been disclosed by which the MS may compute the TA for the different beam pairs, using the TA for only one of the pairs. As an example, assuming that the TA value for beam pair 1, TA1, is available at the MS, the TA value for beam pair 2, TA2, may be computed as:

$$TA2=TA1+2*(T2-T1)=TA1+2\Delta T,$$

where $\Delta T=T2-T1$ is the difference in the propagation delays experienced by the two beam pairs, which is available at the MS, e.g., using the downlink synchronization channels.

In an embodiment of this disclosure, the computation of the TA values for different beam pairs is performed at the BS, rather than being performed at the MS. To assist the BS in this computation, the MS may send the value of the difference in the propagation delays, $\Delta T$, to the BS. For example, considering the scenario of two beam pairs, beam pair 1 and beam pair 2, the MS may perform a RACH preamble transmission on one of the beam pairs (e.g., beam pair 1) and send the value of the difference in the propagation delays, $\Delta T=T2-T1$ to the BS. The BS may then provide the MS with the TA values for both beam pairs, or one of the beam pairs. The computation of the TA values at the BS may be based on the arrival time of the RACH preamble transmission on beam pair 1, and the difference in propagation delays $\Delta T$.

The transmission of the difference in propagation delays, $\Delta T$, may be performed by the MS at any point of time after the $\Delta T$ value is acquired by the MS. For instance, the MS may transmit $\Delta T$ before beam switching (from beam pair 1 to beam pair 2). The BS may also instruct the MS to provide $\Delta T$ value at a given instant.

While the preceding embodiments have been illustrated using only two beam pairs, they can be generalized to any number of beam pairs. For example, the MS may perform RACH preamble transmission on one beam pair (e.g., beam pair 1), and for another beam pair (e.g., beam pair K), the MS may send the difference in the propagation delays experienced on beam pair K and beam pair 1, i.e., $\Delta TK=TK-T1$, where TK denotes the propagation delay encountered for beam pair K. More generally, the MS may send RACH preamble transmission on any number of beam pairs, and send the differences in propagation delays for any number of beam pairs.

Updates of Timing Advance Parameters

As described above, it is possible for the MS (or the BS) to obtain the TA value for all beam pair combinations, using the TA value for any one of the pairs, and the differences in the downlink timings for the different beam pairs. These differences may be obtained at the MS, using, for example, the downlink synch channel transmissions (PSCH/SSCH). More specifically, assuming that the TA value for beam pair 1 is TA1, the TA value for beam pair 2, TA2, may be computed as:

$$TA2=TA1+2*(T2-T1)=TA1+2\Delta T,$$

where $\Delta T=T2-T1$ is the difference in the downlink timings for the two beam pairs.

Consequently, using this approach, the MS may acquire the TA for all beam pair combinations, using the RACH preamble transmission for only one of the beam pairs. The computation of the TA values for the different beam pairs, using the TA value for one of the beam pairs, may be performed at the MS itself, or at the BS (using the $\Delta T$ value provided by the MS).

In communication systems such as 3GPP LTE/LTE-A, once the MS has acquired the initial TA value, the TA value may be updated at a later time (for example, the update may be used to account for mobility, or to account for different clock drifts at the MS and the BS). This TA update is usually based on a timing advance command sent by the BS to the MS. In 3GPP LTE/LTE-A, the initial TA response to a random access procedure includes an 11-bit timing advance command, while the update (or adjustment) of the TA value is based on a 6-bit timing advance update command. Both the commands indicate a change of uplink timing relative to the current uplink timing as multiples of 16 $T_S$, where $T_S$ represents the chip duration. In LTE, 16 $T_S$=0.52 µs. The 11-bit initial command conveys a value in the range of 0x16 $T_S$=0, to, 1282×16 $T_S$=0.67 ms. The 6-bit update command indicates an adjustment of the current TA in the range of −31×16 $T_S$=−16.2 µs, to, +32×16$T_S$=+16.64 µs.

In communication systems such as LTE, the BS needs to send only one TA update command to each MS. In directional communication systems, since the BS and the MS may communicate using any of multiple possible beam pair combinations, it would appear that the BS may need to send TA update commands corresponding to each of the beam pairs. This can lead to extreme overhead. In the following embodiments, methods are disclosed by which the BS provides the TA update for only one beam pair, and the MS may compute the TA update for the other beam pairs using this one TA update command.

The timing advance associated with a particular beam pair is dependent on the propagation delay experienced on that beam pair. Therefore, a different TA may be used for different beam pairs. FIG. 8 shows one example scenario where the propagation delays corresponding to two beam pairs with indices (I1, J1) and (I2, J2) are depicted. In the methods disclosed above, the TA for different beam pairs may be acquired using the TA for only one of the beam pairs, which can in turn be acquired using a RACH preamble transmission. More specifically, assuming that the TA value for beam pair 1 is TA1, the TA value for beam pair 2, TA2, may be expressed as:

$$TA2=TA1+2*(T2-T1)=TA1+2\Delta T,$$

where $\Delta T=T2-T1$ is the difference in the propagation delays experienced by the two beam pairs (available, for example, at the MS using the downlink timings obtained from the downlink synchronization channel).

Turning again to FIG. 9, the MS first acquires downlink timing, e.g., using the downlink synchronization channel PSCH/SSCH. For the two beam pairs, the downlink timing is expected to be close to the downlink propagation delays, T1 and T2. Based on these downlink timings, if the MS were to perform uplink transmission, without applying any timing advance, the uplink transmissions corresponding to the two beam pairs would be received at the BS at times 2*T1 and 2*T2. Consequently, the offset between the arrival from beam pair 2 and beam pair 1 is 2*(T2−T1)=2$\Delta T$. Hence, to ensure that the transmissions from the two beam pairs are aligned in time at the BS, the timing advance used by beam pair 2 must account for this offset, thereby giving:

$$TA2=TA1+2\Delta T.$$

As described above, the computation of TA2 may be performed at the MS itself, using TA1 (obtained using a RACH procedure) and $\Delta T$, or the MS may convey the $\Delta T$ value to the BS, and use the TA2 value provided by the BS. While the preceding embodiments focus on two beam pairs, the embodiments can be generalized to any number of beam pairs.

The following embodiments provide methods for the update (or adjustment) of the Timing Advance values. In particular, due to mobility, or due to different clock drifts at the BS and the MS, it can be expected that the TA values may need to be updated occasionally. In some systems, the BS may send the required TA update commands for different beam pairs separately. However, the following embodiments provide methods by which the BS may send the TA update command corresponding to only one beam pair, and the MS may compute the TA updates for the other beam pairs itself.

As an example, let us again consider the scenario of two beam pairs. Let TA1(t) denote the timing advance for beam pair 1, as a function of time. In particular, let TA1 (t1) and TA1 (t2) denote the values of the timing advance for beam pair 1 at two time instants, t1 and t2. Without loss of any generality, assume t2>t1. Similarly, let the timing advance values for beam pair 2, at the time instants t1 and t2, be denoted as TA2(t1) and TA2(t2). Also, denote the downlink timings for the beam pair 1, at times t1 and t2, as T1(t1) and T1(t2), and denote the downlink timings for the beam pair 2, at times t1 and t2, as T2(t1) and T2(t2).

In order to ensure uplink timing alignment at the BS at time t1, it is desired to have:

$$2*T1(t1)-TA1(t1)=2*T2(t1)-TA2(t1), \rightarrow TA2(t1)=TA1(t1)+2[T2(t1)-T1(t1)], \rightarrow TA2(t1)=TA1(t1)+2\Delta T(t1),$$ [Eqn. 1]

where $\Delta T(t1)=T2(t1)-T1(t1)$ denotes the difference in the downlink timings between the two beam pairs at time instant t1.

In a similar, manner, to ensure timing alignment at the BS at time t2, it is desired to have:

$$TA2(t2)=TA1(t2)+2\Delta T(t2),$$ [Eqn. 2]

where $\Delta T(t2)=T2(t2)-T1(t2)$ denotes the difference in the downlink timings between the two beam pairs at time instant t2.

Subtracting (1) from (2), the following result is obtained:

$$TA2(t2)-TA2(t1)=[TA1(t2)-TA1(t1)]+[2\Delta T(t2)-2\Delta T(t1)].$$ [Eqn. 3]

The notation $\delta$ will now be used to denote the change in value of a particular variable over time. For instance:

$$\delta TA2=TA2(t2)-TA2(t1),$$

$$\delta TA1=TA1(t2)-TA1(t1),$$

$$\delta \Delta T=\Delta T(t2)-\Delta T(t1).$$

Using Equation 3 and this notation provides the following:

$$\delta TA2=\delta TA1+2\delta \Delta T.$$ [Eqn. 4]

In other words, it is desired that the adjustment (over time) in the timing advance for beam pair 2 is equal to the sum of the adjustment in the timing advance for beam pair 1 and twice the change in the difference of the downlink timings for the two beam pairs.

Consequently, if the MS were to receive the adjustment in TA1 from the BS, the MS can acquire the desired value of the adjustment in TA2, using the adjustment in TA1, and the change in the difference of the downlink timings. The adjustment in TA2 may then be used to obtain the new value of TA2, i.e., the value TA2(t2), as:

$$TA2(t2)=TA2(t1)+\delta TA2.$$

While the preceding analysis applies to the example of two beam pairs, it is noted that, more generally, this analysis can be used to relate the TA adjustment for any beam pair with the TA adjustment for any other beam pairs. Hence, the disclosed method may be used by the MS to compute the TA adjustment for any of the beam pairs using the TA adjustment provided by the BS for one of the beam pairs. The change in the difference of downlink timings may be acquired by the MS based on the downlink synch channels (PSCH/SSCH).

Equation 4 relates the adjustment in the TA values for the 2 beam pairs. Using $\delta$ TA1 (obtained at the MS by reception of a TA update command sent by the BS), the MS may thus compute $\delta$TA2. The value of $\delta$TA1 may be provided by the BS directly, or may be inferred by the MS using an index transmitted by the BS. For instance, the BS may transmit one of a possible set of $2^K$ indices, assuming that a TA update command consists of K bits of information. The desired update in the TA value, $\delta$TA1, may be a function of this index. A similar analysis applies for the initial Timing Advance transmission as well.

In an embodiment of this disclosure, the MS may acquire the value of the desired timing advance values for the different beam pairs. Considering the example scenario of two beam pairs, Equation 2 provides the relation:

$$TA2(t2)=TA1(t2)+2\Delta T(t2).$$

That is, the TA2 value at time t2 can be obtained from the TA1 value at time t2, and the difference in the downlink timings at time t2. Assuming, for example, that at time t2, the BS sends a timing advance update command for TA1, the MS may first compute TA1(t2) using the relation:

$$TA1(t2)=TA1(t1)+\delta TA1,$$

where $\delta$TA1 may be indicated directly by the BS, or may be inferred by the MS based on the information sent by the BS.

Once the MS acquires the value TA1(t2), the MS may then obtain the value TA2(t2) using the following:

$$TA2(t2)=TA1(t2)+2\Delta T(t2),$$

by directly adding twice the difference in downlink timings at time t2, i.e., $2\Delta T(t2)$ (which may in turn be obtained, for example, using the downlink synch channels). In other words, the MS may not first compute the value $\delta \Delta T$, in order to first obtain $\delta TA2=\delta TA1+\Delta T$, and then obtain TA2(t2). Rather, the MS may directly obtain TA2(t2), without explicitly computing $\delta \Delta T$ and $\delta TA2$.

In general, the MS may employ the equations derived in this disclosure in any order, and compute any number of the variables considered in these equations, to obtain the desired TA values for the different beam pairs.

In an embodiment of this disclosure, the computation of the downlink timings (e.g., using downlink synch channel PSCH/SSCH) is considered in more detail. Specifically, the TA update command sent by the BS to the MS may be transmitted at any instant of time. Considering the example scenario of two beam pairs, assume that, at a particular time, the BS transmits a TA update command for beam pair 1. Once this is received by the MS, the MS can adjust the value of TA1. However, in order to adjust the value of the timing advance for beam pair 2 (i.e., TA2), the MS may need to utilize the difference in the downlink timings of the two beam pairs.

In one implementation, this difference may be computed by the MS after it receives the preceding TA update command from the BS (for example, using the PSCH/SSCH transmissions following the reception of the TA update command). In another implementation, the MS may simply use the downlink timing information that has already been acquired at some previous instant of time. For example, the MS may keep updating its downlink timing information for different beam pairs on a periodic or aperiodic basis, and use the most recent downlink timing information that is available. Also, the downlink timings used by the MS for different beam pairs may not have been acquired all at the same point in time. For example, at some point in time, some of the beam pairs may not have a good enough channel to allow downlink timing acquisition. In this case, the MS may update the downlink timing for only a subset of the beam pairs. In general, the MS may maintain a table of downlink timings corresponding to the different beam pairs, and may continue updating these timings on occasion.

Table 3 depicts an exemplary method by which the MS may maintain the downlink timings for different beam pairs (considering, for example, 4 possible beam indices at both the MS and the BS). As discussed in this embodiment, the MS may continue updating this table with time. Note that, an alternate (but equivalent) set of values that the MS may maintain is the differences in downlink timings, rather than the actual downlink timings. In this case, the MS may also maintain one (or more) of the actual downlink timings for reference.

TABLE 3

Set of downlink timing values corresponding to the different beam pairs

| BS beam index | MS beam index | | | |
|---|---|---|---|---|
| | 1 | 2 | 3 | 4 |
| 1 | T1, 1 | T1, 2 | T1, 3 | T1, 4 |
| 2 | T2, 1 | T2, 2 | T2, 3 | T2, 4 |
| 3 | T3, 1 | T3, 2 | T3, 3 | T3, 4 |
| 4 | T4, 1 | T4, 2 | T4, 3 | T4, 4 |

In an embodiment of this disclosure, the MS may perform TA update computations only for a certain number of beam pairs, rather than performing computations for all combinations.

This may be the case, for example, if the channel strength on some of the beam pairs is not good enough to support any transmission at all.

In an embodiment of this disclosure, the selection of the beam pair for which the BS transmits the TA update command is considered. The BS may make this selection by itself, for example, based on its current understanding of the strongest beam pair (i.e., the beam pair with the best channel quality between the BS and the MS). This could be based, for example, on an uplink pilot transmission, such as a Sounding Reference Signal (SRS). Alternatively, the beam pair of choice could also be a beam pair on which the BS and MS are currently communicating (e.g., data transmission), or communicated last. In another implementation, the BS and the MS may select the beam pair together using a mechanism to exchange information, e.g., information regarding the strongest beam pair. As another option, the selection of the beam pair for which the BS sends the TA update command may be predetermined (and fixed, or change with time in some order). This pre-determined selection may be known to the MS as well.

In any of the preceding alternatives, when sending the TA update command, the BS may transmit a message explicitly indicating the beam pair for which the TA update command is valid. This may be performed every time a TA update command is sent, or only when the beam pair for which the TA update command is being sent is different from the beam pair on which the TA update command was sent previously.

Figure 11:
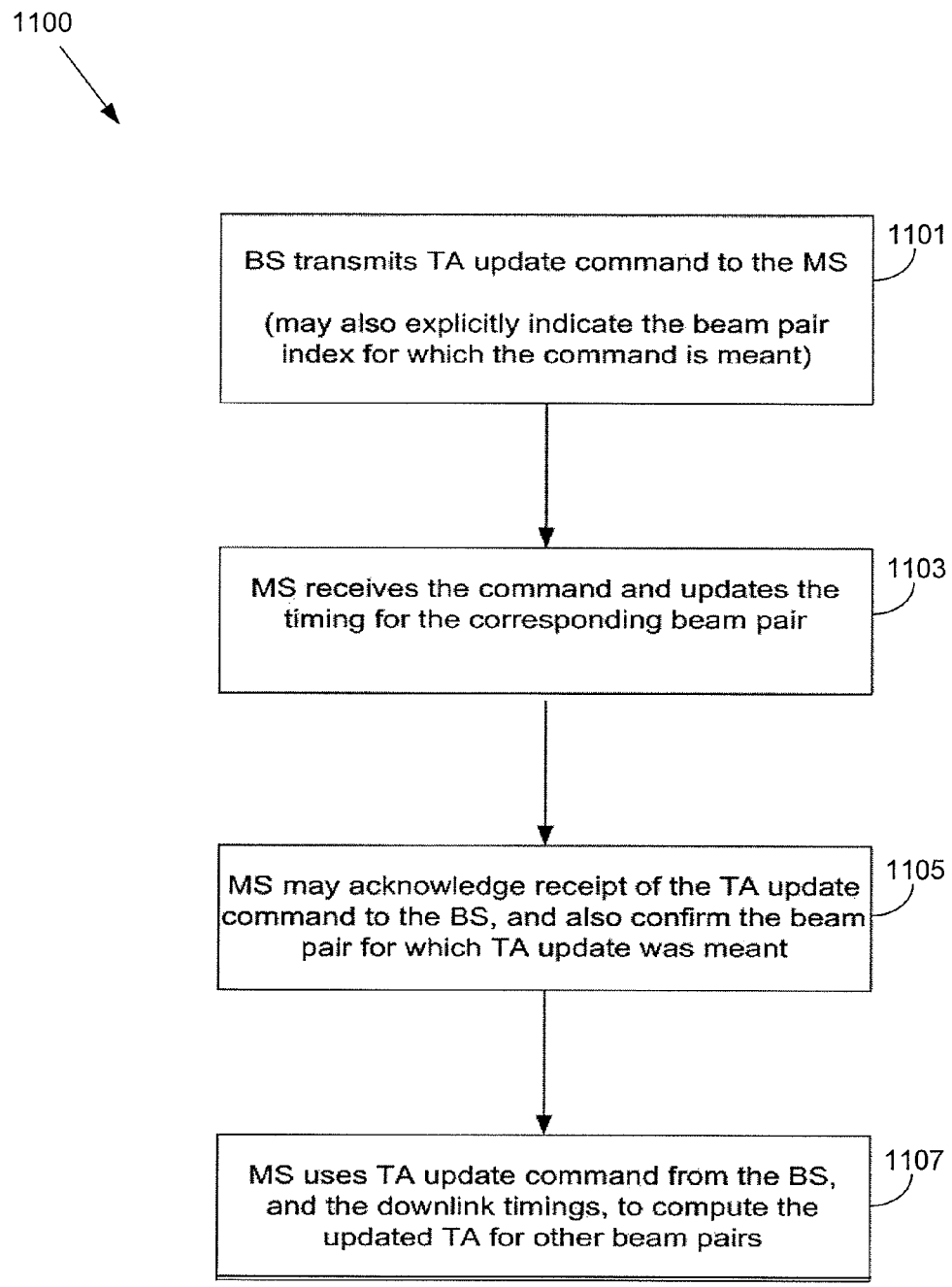
FIG. 11 illustrates an example method for timing advance update, according to an embodiment of this disclosure.

FIG. 11 illustrates an example method for TA update, according to an embodiment of this disclosure. The embodiment of method 1100 illustrated in FIG. 11 is for illustration only. Other embodiments of method 1100 could be used without departing from the scope of this disclosure.

In method 1100, the transmission of the TA update command for one particular beam pair choice from the BS is considered. Initially, in operation 1101, the BS indicates this choice to the MS. In operation 1103, upon successful reception of this command, the MS applies the corresponding TA update to the beam pair indicated by the BS. In operation 1105, the MS may acknowledge this action to the BS. In operation 1107, using the downlink timings, the MS then computes the TA updates (and the new TA values) for the other beam pairs.

So far, in this disclosure, scenarios have been considered where the BS transmits the TA update command for only one beam pair. In an embodiment, the BS may transmit the TA update command for more than one beam pair. Based on the received command, the MS may update the TA values for the beam pairs for which the BS provided the update. For the other beam pairs, the MS may use the methods disclosed in this disclosure to obtain the TA updates, using any one (or possibly more) of the beam pairs for which the BS provided the TA update.

So far in this disclosure, scenarios have been considered where the BS transmits a TA update command to the MS, corresponding to one of the beam pairs, and the MS obtains the TA update corresponding to other beam pairs by itself. This may require the MS to compute the differences in the downlink timings across different beam pairs. Using these differences, and the TA update provided by the BS for one of the beam pairs, the MS may then compute the TA update for the other beam pairs.

In another embodiment of this disclosure, the MS transmits the differences in the downlink timings to the BS, rather than computing the TA updates by itself. Using these differences in the downlink timings, the BS may then compute the TA updates for the different beam pairs, and transmit the TA updates to the MS. Upon reception of these TA updates, the MS may then use the TA updates to obtain the new TAs for the different beam pairs.

The MS may send the differences in downlink timings for any number of beam pair combinations to the BS, and the BS may then inform the MS about the TA updates for any number of beam pair combinations. Also, for the TA update, as disclosed in this disclosure, it is actually sufficient to only know the update (i.e., change) in the difference of the downlink timings between different beam pairs. Thus, the MS may actually transmit these updates to the BS (rather than transmitting the differences in the downlink timings). The procedure for the MS to transmit the differences in the downlink timings to the BS (or the updates of these differences) may be triggered by an initial TA update command transmitted by the BS to the MS. As part of this command, besides indicating the TA update(s), and the beam pair(s) for which these TA update(s) hold, the BS may also instruct the MS to send the differences in the downlink timings (or updates in them) for a certain set of beam pairs. This procedure is depicted in FIG. 12.

Figure 12:
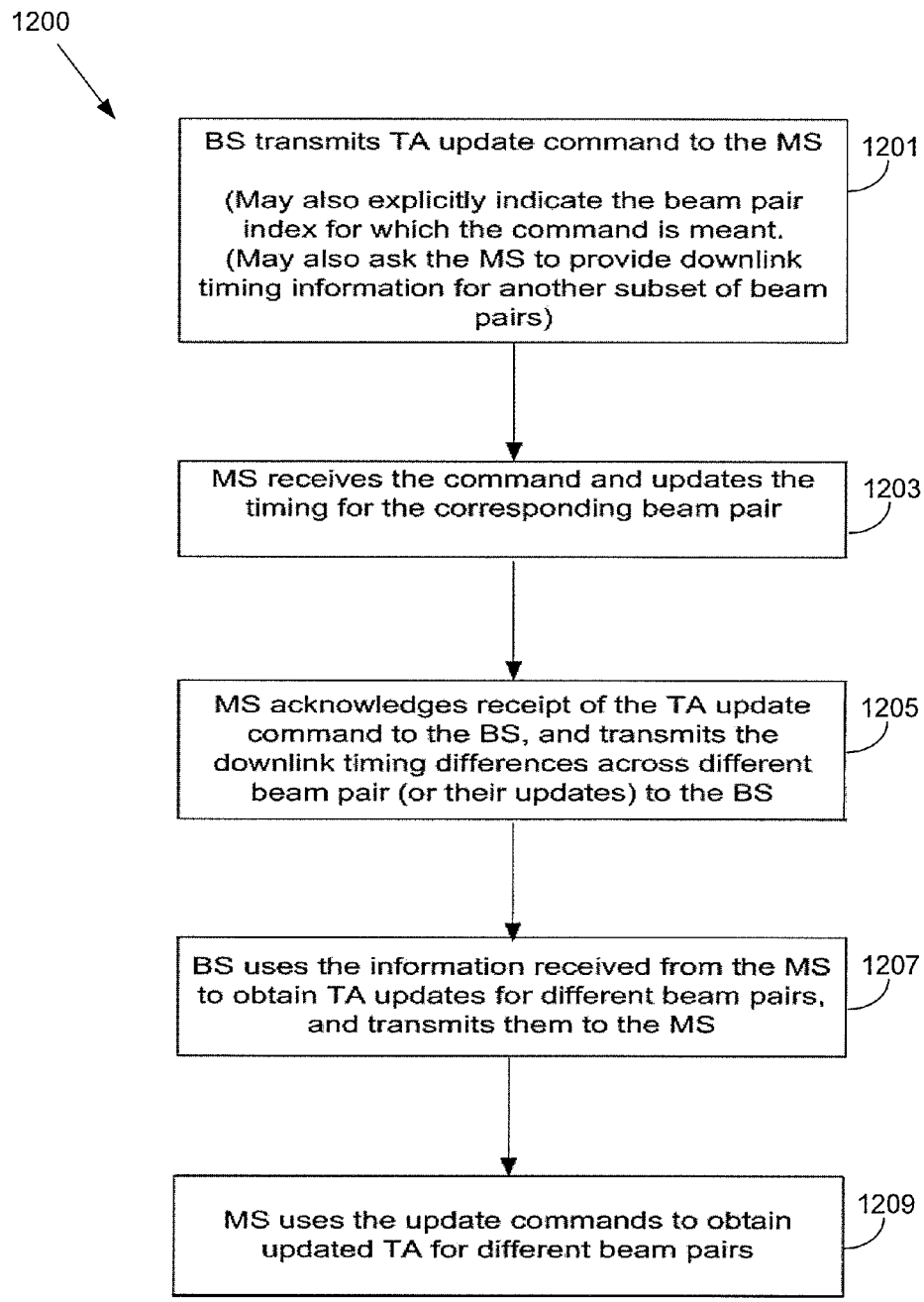
FIG. 12 illustrates another example method for timing advance update, according to an embodiment of this disclosure.

FIG. 12 illustrates another example method for TA update, according to an embodiment of this disclosure. The embodiment of method 1200 illustrated in FIG. 12 is for illustration only. Other embodiments of method 1200 could be used without departing from the scope of this disclosure.

Initially, at operation 1201, the BS transmits the TA update command to the MS. The BS may also explicitly indicate a beam pair index for which the command is meant. The BS may also ask the MS to provide downlink timing information for another subset of beam pairs. In operation 1203, the MS receives the command and updates the timing for the corresponding beam pair. In operation 1205, the MS acknowledges receipt of the TA update command to the BS, and transmits the downlink timing differences across different beam pairs (or their updates) to the BS. In operation 1207, the BS uses the information received from the MS to obtain TA updates for different beam pairs, and transmits them to the MS. In operation 1209, the MS uses the update commands to obtain the updated TA for the different beam pairs.

In an embodiment of this disclosure, a scenario is considered where the uplink (UL: MS to BS) transmission and the downlink (DL: BS to MS) reception at the MS may not be calibrated. For example, beamforming during UL transmission, and DL reception, at the MS may be performed using RF antenna arrays. The use of these arrays may not be perfectly calibrated for UL transmission and DL reception. In this scenario, it may not be possible for the MS to use the downlink timings (obtained, e.g., using PSCH/SSCH) for the purpose of uplink timing advance computations. Therefore, if this calibration cannot be ensured, explicit mechanisms may be used for initial TA advance computation, as well as TA updates, for different beam pairs.

For example, for initial TA computation, the MS may perform RACH preamble transmission corresponding to the different beam pairs. (These RACH transmissions may happen at different instants of time.) Upon receiving these RACH preambles, the BS may inform the MS about the corresponding TA values. While transmitting the RACH preambles, the MS may also indicate the MS beam index on which the transmission is performed.

In another embodiment, the MS may not perform RACH preamble transmission corresponding to all beam pairs, but only a subset. This subset may be configurable; for example, the subset may be conveyed to the MS by the BS. Alternatively, the MS may select a subset of beam pairs that ensure a certain channel quality (measured, for example, by a signal to noise ratio). The number of beam pairs in the subset may vary over time. For the TA update, when calibration is not ensured, the BS may provide explicit update commands for different beam pairs. Again, as in the case of the initial TA procedure, the set of beam pairs for which the BS sends the TA update commands may be configurable, and may vary over time.

In an embodiment of this disclosure, when the BS transmits multiple TA values, or multiple TA update values, to the MS, the BS employs one or more types of coding in order to convey these multiple values efficiently. For example, differential encoding (e.g., wherein the BS conveys one of the values, and conveys the other values via their difference from the said value) can be used if the different values are expected to be close to each other.

In an embodiment of this disclosure, the TA values may not be applied directly, but may first be mapped to the closest value in a pre-defined set. For example, the MS may not be able to apply any arbitrary timing advance (clock adjustment), but may only have the capability to apply a timing advance belonging to a discrete set. This type of mapping to a nearest value in a pre-defined set may be applied at any stage of the TA computation procedure. For example, even the TA update value may be mapped to a nearest value in a pre-defined set.

In an embodiment of this disclosure, a scenario is considered where the beam widths used for communication can be variable. For example, the downlink synch channel transmission and the RACH transmission may be performed on a set of wide beams, while the uplink data transmission may be performed on narrower, more powerful beams. Even in this scenario, the methods described in this disclosure may be used to obtain the TA updates associated with uplink transmission (using narrow beams). As long as the TA update provided by the BS also indicates the beam pair for which the TA update is meant, the MS may use this TA update to obtain the TA updates (and the updated TA) for the remaining beam pairs. This is because, irrespective of the beam widths used, the TA for any beam pair (e.g., BP2) may be obtained if the TA for another beam pair (e.g., BP 1) is known (based on the update provided by the BS), and the difference between the downlink timing for the two beam pairs is known. The difference in the downlink timing for beam pairs having different widths may be known based on some of the transmitted pilots. For example, for narrower data beams, the downlink timing may be based on channel state information reference symbols (CSI-RS). As an alternative, for a narrow beam pair, the MS may continue to use the downlink timing (and updates) of a wider beam pair (e.g., a wider beam pair that contains the narrow beam pair, if one exists).

The analytical formulation disclosed herein for computation of TA2, is TA2=TA1+2ΔT. This relates the timing advance on beam pair 2 to the timing advance on beam pair 1 and the difference in the propagation delays. Modifications to this analytical formulation (e.g., to account for some non-idealities), while still using TA1 and ΔT to obtain TA2 are plausible. In general, TA2 could be computed as TA2=f(TA1, ΔT), where f(TA1, ΔT) denotes a function of TA1 and ΔT.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for uplink timing alignment by a mobile station in a wireless network, the method comprising:
   receiving a first downlink synchronization signal from a base station on a first beam pair at a first time associated with a first propagation delay;
   receiving a second downlink synchronization signal from the base station on a second beam pair at a second time associated with a second propagation delay; and
   determining a second timing advance for the second beam pair based on a known first timing advance for the first beam pair and a time difference between the first time and the second time.

2. The method of claim 1, wherein determining the second timing advance is represented by:

$$TA2=TA1+2\Delta T$$

where TA2 is the second timing advance for the second beam pair, TA1 is the known first timing advance for the first beam pair, and ΔT is the time difference between the first time associated with the first propagation delay and the second time associated with the second propagation delay.

3. The method of claim 1, wherein the known first timing advance for the first beam pair is transmitted from the base station to the mobile station in a random access channel (RACH) response message.

4. The method of claim 1, wherein the first beam pair is selected from a plurality of beam pairs based on at least one of: a greatest signal strength among the plurality of beam pairs, an indication of a beam pair from the base station, and a beam pair that is currently being used for communication between the mobile station and the base station.

5. The method of claim 1, further comprising:
   upon a request to update timing advances, updating the second timing advance for the second beam pair based on a known change in the first timing advance and a change in the time difference between the first time associated with the first propagation delay and the second time associated with the second propagation delay.

6. The method of claim 5, wherein updating the second timing advance is represented by:

$$\delta TA2=\delta TA1+2\delta\Delta T$$

where $\delta TA2$ is a change in the second timing advance for the second beam pair, $\delta TA1$ is the known change in the first timing advance for the first beam pair, and $\delta\Delta T$ is the change in the time difference between the first time associated with the first propagation delay and the second time associated with the second propagation delay.

7. An apparatus for use in a mobile station configured for uplink timing alignment in a wireless network, the apparatus comprising:
a processor configured to:
receive a first downlink synchronization signal from a base station on a first beam pair at a first time associated with a first propagation delay;
receive a second downlink synchronization signal from the base station on a second beam pair at a second time associated with a second propagation delay; and
determine a second timing advance for the second beam pair based on a known first timing advance for the first beam pair and a time difference between the first time and the second time.

8. The apparatus of claim 7, wherein the determination of the second timing advance is represented by:

$$TA2=TA1+2\Delta T$$

where TA2 is the second timing advance for the second beam pair, TA1 is the known first timing advance for the first beam pair, and $\Delta T$ is the time difference between the first time associated with the first propagation delay and the second time associated with the second propagation delay.

9. The apparatus of claim 7, wherein the known first timing advance for the first beam pair is transmitted from the base station to the mobile station in a random access channel (RACH) response message.

10. The apparatus of claim 7, wherein the first beam pair is selected from a plurality of beam pairs based on at least one of: a greatest signal strength among the plurality of beam pairs, an indication of a beam pair from the base station, and a beam pair that is currently being used for communication between the mobile station and the base station.

11. The apparatus of claim 7, the processor further configured to:
upon a request to update timing advances, update the second timing advance for the second beam pair based on a known change in the first timing advance and a change in the time difference between the first time associated with the first propagation delay and the second time associated with the second propagation delay.

12. The apparatus of claim 11, wherein the update of the second timing advance is represented by:

$$TA2=\delta TA1+2\delta\Delta T$$

where $\delta TA2$ is a change in the second timing advance for the second beam pair, $\delta TA\ 1$ is the known change in the first timing advance for the first beam pair, and $\delta\Delta T$ is the change in the time difference between the first time associated with the first propagation delay and the second time associated with the second propagation delay.

13. A method for uplink timing alignment by a base station in a wireless network, the method comprising:
transmitting a first downlink synchronization signal to a mobile station on a first beam pair, the first downlink synchronization signal received at the mobile station at a first time associated with a first propagation delay;
transmitting a second downlink synchronization signal to the mobile station on a second beam pair, the second downlink synchronization signal received at the mobile station at a second time associated with a second propagation delay; and
receiving from the mobile station a time difference between the first time and the second time, and determining a second timing advance for the second beam pair based on a known first timing advance for the first beam pair and the time difference between the first time and the second time.

14. The method of claim 13, wherein the determination of the second timing advance is represented by:

$$TA2=TA1+2\Delta T$$

where TA2 is the second timing advance for the second beam pair, TA1 is the known first timing advance for the first beam pair, and $\Delta T$ is the time difference between the first time associated with the first propagation delay and the second time associated with the second propagation delay.

15. The method of claim 13, wherein the known first timing advance for the first beam pair is estimated at the base station based on a random access channel (RACH) message from the mobile station on the first beam pair.

16. The method of claim 13, wherein the first beam pair is selected from a plurality of beam pairs based on at least one of: a greatest signal strength among the plurality of beam pairs, an indication of a beam pair from the base station, and a beam pair that is currently being used for communication between the mobile station and the base station.

17. The method of claim 13, further comprising:
receiving from the mobile station a change in the time difference between the first time associated with the first propagation delay and the second time associated with the second propagation delay, and determining an updated value of the second timing for the second beam pair based on a known change in the first timing advance for the first beam pair and the change in the time difference between the first time and the second time.

18. The method of claim 17, wherein the update of the second timing advance is represented by:

$$\delta TA2=\delta TA1+2\delta\Delta T$$

where $\delta TA2$ is a change in the second timing advance for the second beam pair, $\delta TA1$ is the known change in the first timing advance for the first beam pair, and $\delta\Delta T$ is the change in the time difference between the first time associated with the first propagation delay and the second time associated with the second propagation delay.

19. An apparatus for use in a base station configured for uplink timing alignment in a wireless network, the apparatus comprising:
a processor configured to:
transmit a first downlink synchronization signal to a mobile station on a first beam pair, the first downlink synchronization signal received at the mobile station at a first time associated with a first propagation delay;
transmit a second downlink synchronization signal to the mobile station on a second beam pair, the second downlink synchronization signal received at the mobile station at a second time associated with a second propagation delay; and
receive from the mobile station a time difference between the first time and the second time, and determining a second timing advance for the second beam pair based on a known first timing advance for the first beam pair and the time difference between the first time and the second time.

20. The apparatus of claim 19, wherein the determination of the second timing advance is represented by:

$$TA2 = TA1 + 2\Delta T$$

where TA2 is the second timing advance for the second beam pair, TA1 is the known first timing advance for the first beam pair, and $\Delta T$ is the time difference between the first time associated with the first propagation delay and the second time associated with the second propagation delay.

21. The apparatus of claim 19, wherein the known first timing advance for the first beam pair is estimated at the base station based on a random access channel (RACH) message from the mobile station on the first beam pair.

22. The apparatus of claim 19, wherein the first beam pair is selected from a plurality of beam pairs based on at least one of: a greatest signal strength among the plurality of beam pairs, an indication of a beam pair from the base station, and a beam pair that is currently being used for communication between the mobile station and the base station.

23. The apparatus of claim 19, the processor further configured to:
receive from the mobile station a change in the time difference between the first time associated with the first propagation delay and the second time associated with the second propagation delay, and determining an updated value of the second timing for the second beam pair based on a known change in the first timing advance for the first beam pair and the change in the time difference between the first time and the second time.

24. The apparatus of claim 23, wherein the update of the second timing advance is represented by:

$$\delta TA2 = \delta TA1 + 2\delta\Delta T$$

where $\delta TA2$ is a change in the second timing advance for the second beam pair, $\delta TA1$ is the known change in the first timing advance for the first beam pair, and $\delta\Delta T$ is the change in the time difference between the first time associated with the first propagation delay and the second time associated with the second propagation delay.

* * * * *